United States Patent [19]
Costa

[11] Patent Number: 5,220,893
[45] Date of Patent: Jun. 22, 1993

[54] ROTARY INTERNAL COMBUSTINE ENGINE

[76] Inventor: Irenio Costa, 220 SW. 56th Ter., Apartment 206, Margate, Fla. 33063

[21] Appl. No.: 804,004

[22] Filed: Dec. 9, 1991

[51] Int. Cl.⁵ ............................................. F02B 53/00
[52] U.S. Cl. .................................. 123/225; 123/226; 418/175
[58] Field of Search .................. 123/225, 226, 227; 418/175, 177, 245

[56] References Cited

U.S. PATENT DOCUMENTS

| | | | |
|---|---|---|---|
| 897,260 | 8/1908 | Luther | 123/226 |
| 914,281 | 3/1909 | Huscher | 123/225 |
| 1,170,415 | 2/1916 | Clark | 123/226 |
| 1,484,124 | 2/1924 | Foster et al. | 123/226 |
| 1,850,833 | 3/1932 | Erny | 418/245 X |
| 2,146,877 | 2/1939 | Appleton | 123/226 |

*Primary Examiner*—Michael Koczo
*Attorney, Agent, or Firm*—Harry W. Barron

[57] ABSTRACT

A rotary internal combustion engine includes a stationary housing having one or more housing slots extending to a housing interface surface and a rotor, having one or more rotor slots extending to a rotor interface surface turning adjacent to the housing interface surface. A piston and an adjacent vane are slidably mounted in each housing slot, and an intake valve is included to open each housing slot to an intake port. A spark plug is mounted in an outer surface angularly adjacent to each housing slot. The rotor includes cam surfaces to impart motion to each intake valve, piston, and vane. As each rotor slot moves adjacent to each housing slot, a vane is moved into the rotor slot and an intake valve is opened. A mixture of air and fuel floods the space of housing and rotor slots outside the piston on one side of the extended vane, while exhaust gasses from previous combustion are forced out of the space on the opposite side of the extended vane, through an exhaust port, by the motion of the rotor. The intake valve is then closed, and the air fuel mixture is compressed by an outward motion of the piston. The spark plug is activated to ignite this mixture, and the resulting expansion of gasses with combustion propels the rotor by pushing on the leading surface of the rotor slot. The vane and piston are withdrawn into the housing slot before impact with the trailing surface of the rotor slot.

58 Claims, 8 Drawing Sheets

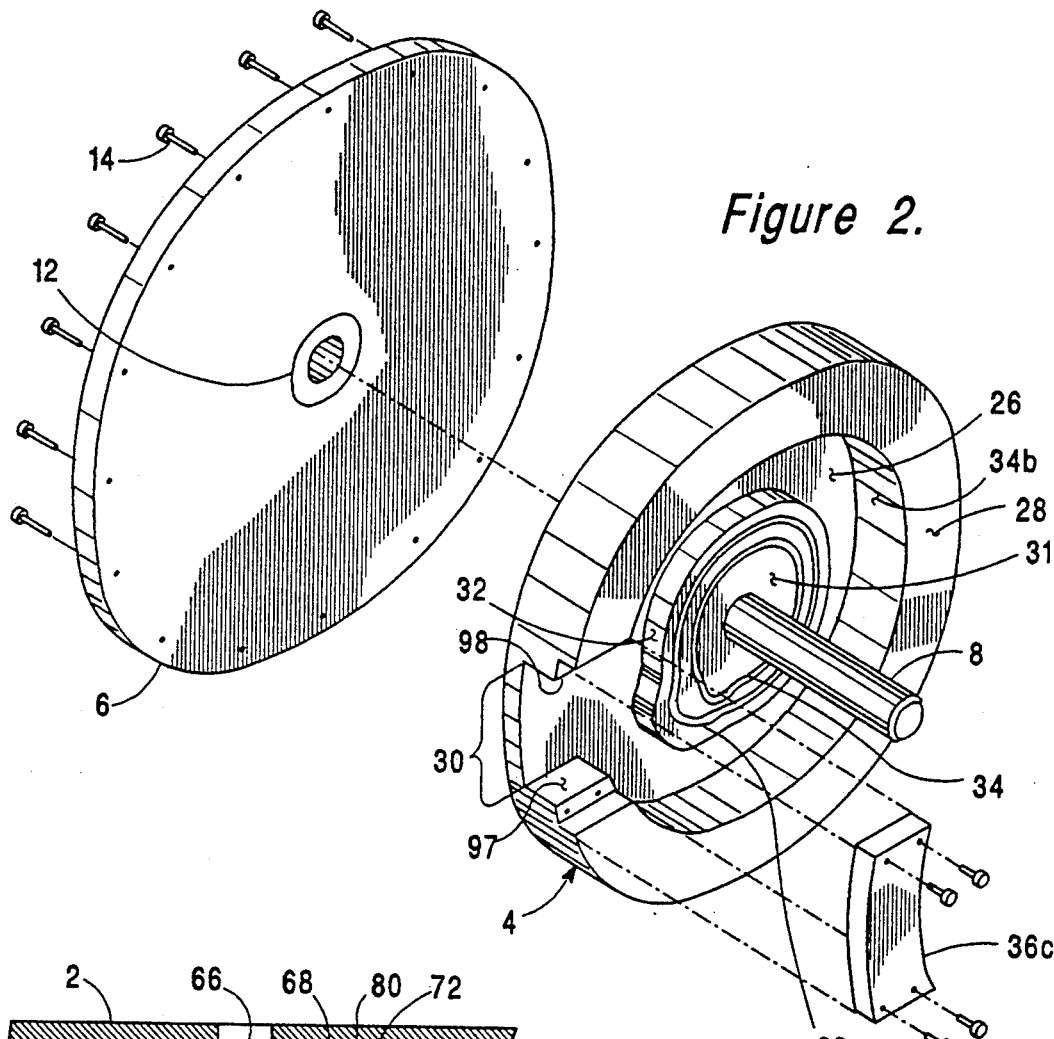
Figure 2.
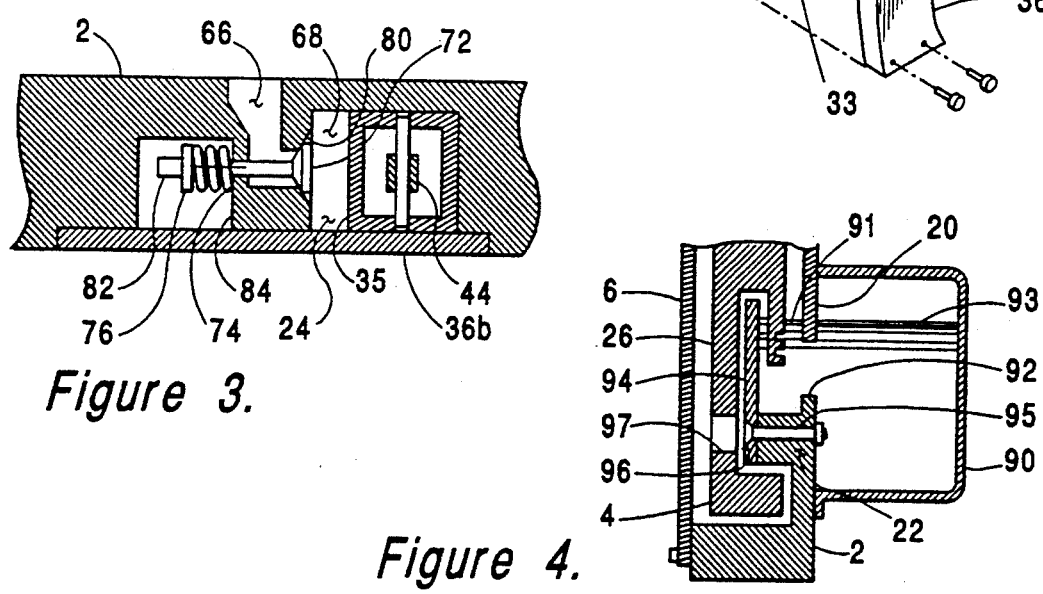
Figure 3.
Figure 4.

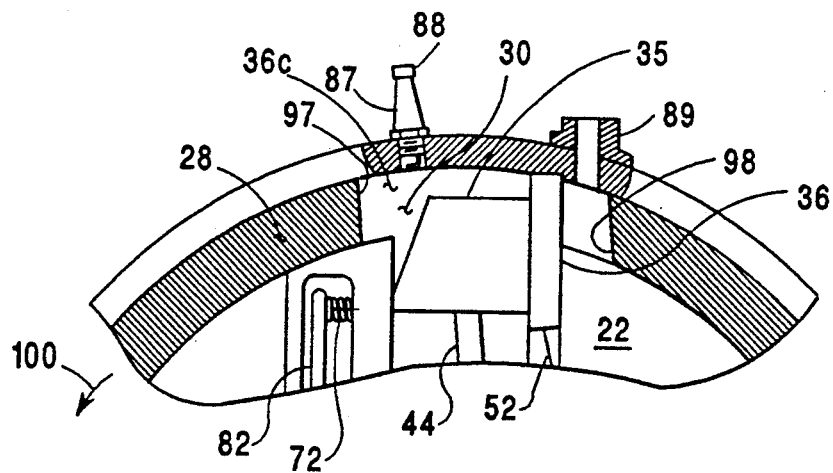
Figure 9.
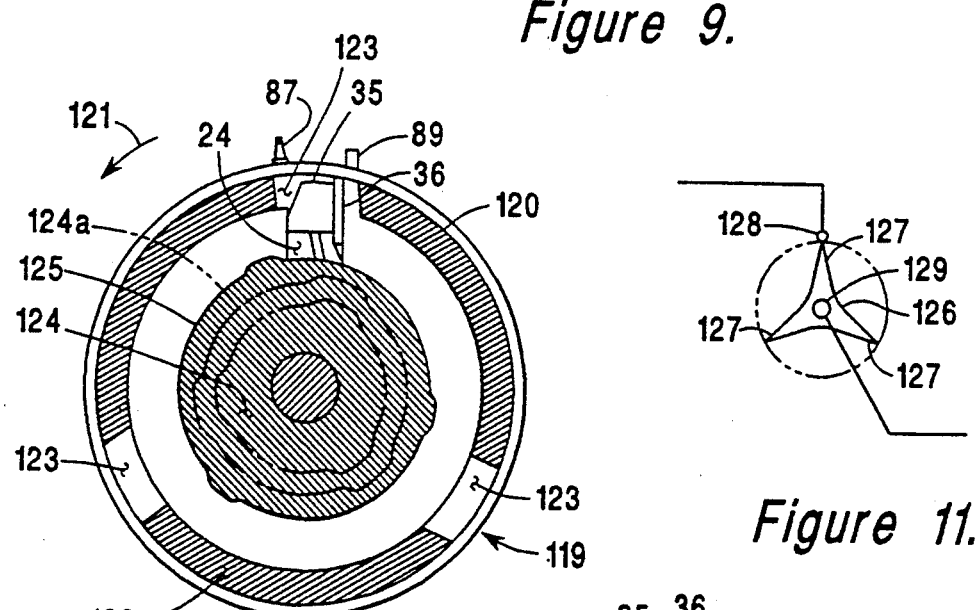
Figure 10.
Figure 11.
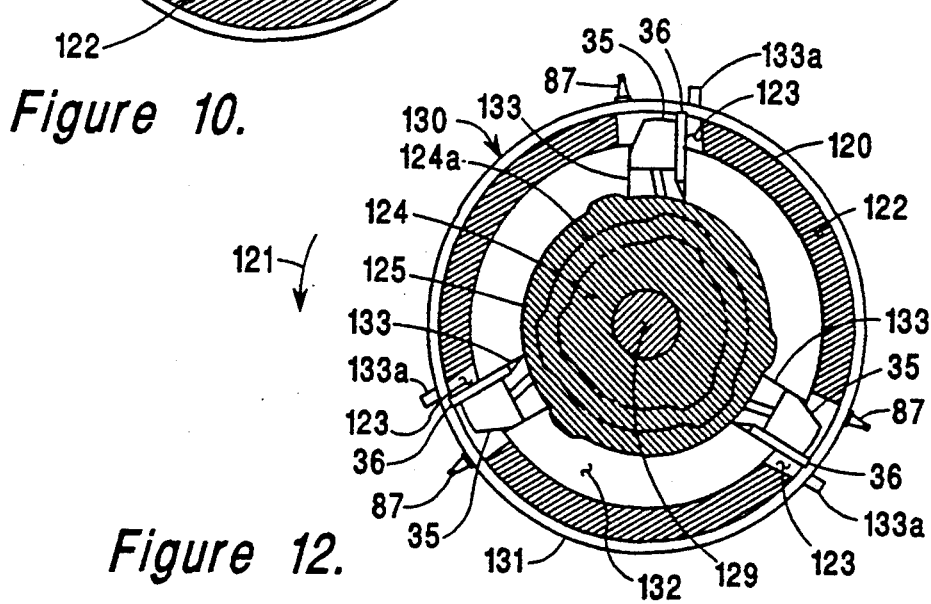
Figure 12.

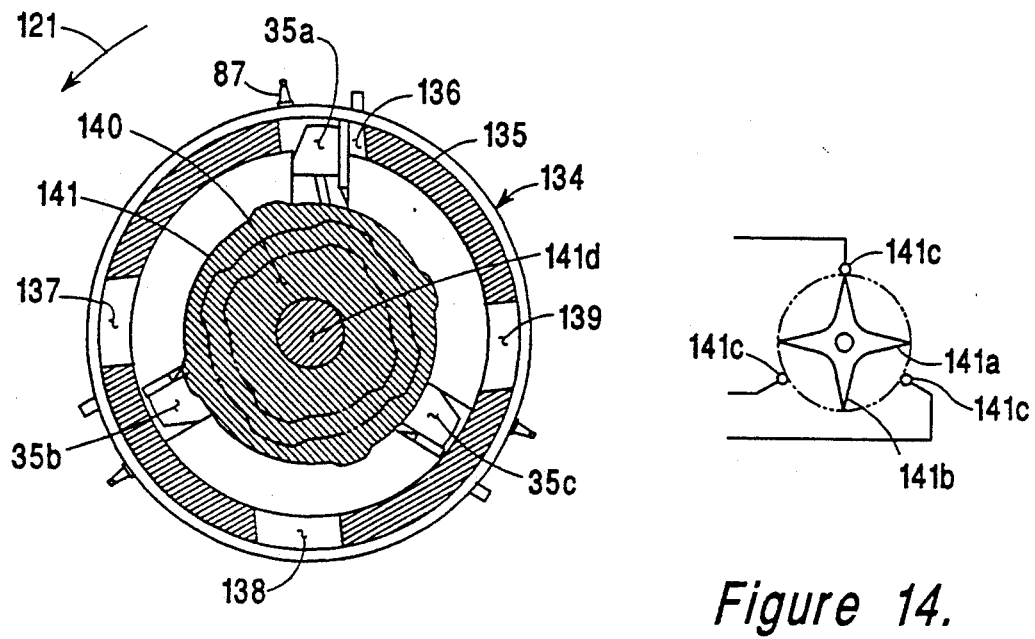
Figure 13.
Figure 14.
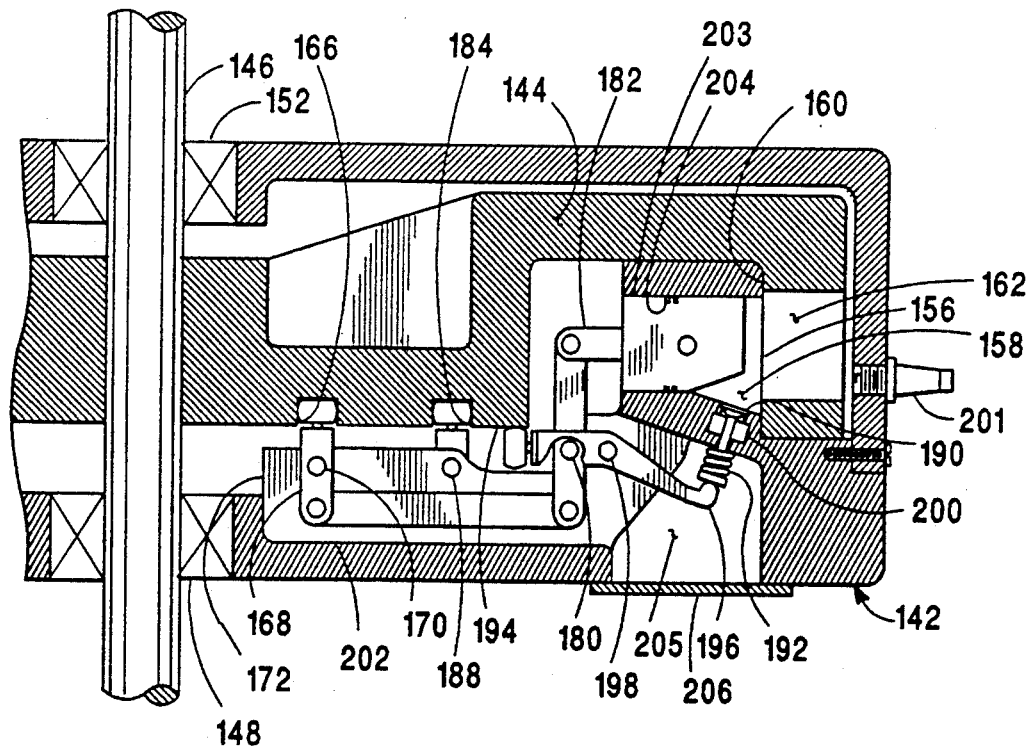
Figure 15.

ROTARY INTERNAL COMBUSTINE ENGINE

BACKGROUND OF THE INVENTION

1. Field of the Invention

This invention relates to an internal combustion engine, and more particularly, to an internal combustion engine having a stationary portion and a rotary portion, in which rotational power is supplied to the rotary portion from the controlled internal combustion of a fuel.

2. Background Information

The basic functions of an internal combustion engine are the intake of a combustible mixture into a working area, the compression of the mixture, the ignition of the mixture with its subsequent expansion, and the removal of combustion by products to an exhaust system. The expansion portion of the cycle is the part which produces useful work. Traditional reciprocating internal combustion engines use the reciprocating motion of a piston in a cylinder to perform these functions. Motion is then obtained by connecting the piston with a connecting rod to an eccentric portion of a crankshaft.

In a four stroke cycle engine, valves in the top of the cylinder are used to control the intake of the mixture and the release of exhaust gasses. In the first inward stroke, away from the cylinder head, the exhaust valve is shut and the intake valve is opened, so that the piston motion draws the mixture inward. In the first outward stroke, the intake valve is closed and the motion of the piston is used to compress the mixture. In the second inward stoke, the mixture is ignited and allowed to expand. In the second outward stroke, the exhaust valve is opened, and the motion of the piston is used to expel exhaust gasses. A particular disadvantage of this type of engine is that two revolutions of the crankshaft are required for a single power producing expansion cycle.

In a two stroke cycle engine, the valves are eliminated, and intake and exhaust ports are located on opposite sides of the cylinder just above the farthest inward point of piston travel. After each inward (expansion) stroke, exhaust gases under pressure leave the cylinder through the exhaust port, and a new explosive mixture is swept in through the intake port, sweeping most of the remaining gasses out in a process called scavenging. A particular advantage of this type of engine is the fact that one expansion cycle occurs per revolution of the crankshaft. Disadvantages are the inefficiency of the scavenging process, which leaves some exhaust gasses in the cylinder to interfere with efficient combustion, and the fact that external means are often required to blow the combustible mixture into the cylinder.

The diesel engine is another type of internal combustion engine, which is commonly built in both two stroke cycle and four stroke cycle versions reciprocating devices. A Diesel engine typically receives air, instead of a mixture of vaporized fuel and air, at the beginning of each compression stroke. The air is then compressed by the piston motion much harder than the mixture of fuel and air in a gasoline type engine, until a temperature of about 900 to 1100 degrees Fahrenheit is reached with a pressure somewhat above 450 pounds per square inch. Near the end of the compression stroke, Diesel fuel is injected into the cylinder by means of a fuel injector, which can perform this operation working against such pressures. The temperature of the air within the cylinder is high enough to begin the combustion process, so a spark plug is not used.

Rotary internal combustion engines are constructed so that a tangential force is applied to a spinning rotor by gasses expanding after combustion, instead of using the inward motion of a piston driven by such gasses. To make this work, the gasses are allowed to expand between stationary surfaces and a surface extending radially from the rotor to be pushed thereby.

3. Description of the Prior Art

An early example of a rotary internal combustion engine is found in U.S. Pat. No. 688,335, issued to J.H. Reed on Dec. 10, 1901, which describes an engine having a rotor in which a piston is slid inward and outward at an angle under the control of a stationary cam. An arcuate combustion chamber with an open end is mounted on an angularly oscillating sector which is pivotably mounted coaxial with the rotor. Means, including an external compressor, are provided to supply an explosive gas to the combustion chamber. The gas within the chamber is exploded using an electrode, and the tangential forces acting on the side of the piston, since it forms the end of the chamber, propel the rotor as the oscillating sector is returned to its original position. The Reed engine does not provide for expansion of combustion gasses in an enlarging combustion chamber. The sliding piston is simply impacted by an impulse from the exploding gas to operate somewhat like an undershot waterwheel.

One way of allowing combustion gasses to propel a rotor while expanding is to provide a rotor spinning within a generally cylindrical housing, where the rotor includes an abutment extending outward to the internal surface of the housing, and where the housing includes an abutment sliding outward to permit the adjacent passage of the rotor abutment and inward after such passage. The expansion of gasses is allowed to occur between these abutments, thereby propelling the rotor. An example of this type of engine is found in U.S. Pat. No. 1,239,853, which was issued to F. Walter on Sep. 11, 1917. This patent shows an engine having a combustion chamber, including a spark plug, built into the rotor abutment. This combustion chamber has an outlet in a trailing wall, which is normally shut by a valve. An explosive mixture, pre-compressed by an external piston, is fed into the combustion chamber through a hole in the shaft of the rotor, to be exploded after opening of the valve, and after the sliding abutment moves inward following the rotor abutment. Expanding gasses then propel the rotor, pushing against the sliding abutment.

A second example of a rotary engine is described in U.S. Pat. No. 1,970,003, which was issued to H.M. Fenati on Aug. 14, 1934. The Fenati patent describes a rotor, with a semicircular groove around most of its outer surface, operating in a housing having a semicircular groove around most of its inner surface, together forming an annular chamber with a circular cross-section. An abutment surface extends outward as a part of the rotor to operate in the annular chamber. A sliding abutment in the housing is moved outward to clear the rotor abutment surface, and is moved inward after its passage. A combustion chamber with a spark plug, supplied by an externally pre-compressed explosive mixture, is provided in the housing outside the sliding abutment. When the abutment, which also acts as a valve, is moved inward, burning and expanding gasses are admitted by the valve to propel the rotor by expanding between the sliding abutment and the rotor abutment.

Another way to provide a rotary engine is to provide a rotor spinning within a housing having an outwardly extended porti between a combustion region and an exhaust port, along with a rotor vane which is moved outward into the extended portion. Examples of rotary engines built in this way have been described, in U.S. Pat. No. 897,260, which was issued to C.H. Luther, Jr. on Aug. 25, 1908, in U.S. Pat. No. 2,018,306, which was issued to D.F. Hunt on Oct. 22, 1938 and in U.S. Pat. No. 2,146,877, which was issued to C. Appleton on Feb. 14, 1939. These engines have rotors carrying radially slidable pistons moved inward and outward by stationary cams. Each engine housing includes an intake port, a combustion chamber with a spark plug, an exhaust port. Each rotor has means, travelling ahead of each piston as the rotor turns, for transversely sealing the outward extended section of the housing. In the C.H. Luther, Jr. invention, a radially sliding vane moved by a second stationary cam track is used for this purpose; in the D.F. Hunt and C. Appleton inventions, a sealing bar or vane is held against the surface of the outwardly extended section.

In the prior art rotary engines, described above, as each piston passes the intake port, it is drawn inward, creating a suction to pull a mixture of air and fuel inward. As each vane enters region of the combustion chamber, it is moved outward to bisect the outwardly extended portion of the housing. As each piston enters the region of the combustion chamber, it is moved outward to compress the mixture of air and fuel, which is then exploded by means of the sparkplug. The expanding gasses from the explosion produce a pressure on the portion of the vane extending into the outwardly extended portion of the housing, thereby propelling the rotor. As the vane passes the exhaust port, it is pulled inward and the gasses within the outwardly extended portion of the housing are vented through the port. While the engines described in the C.H. Luther, Jr. and D.F. Hunt patents each have three pistons and a single combustion chamber, the engine described in the C. Appleton patent has two pistons and two combustion chambers.

U.S. Pat. No. 4,617,886, issued to S.R. Mach on Oct. 21, 1986, shows four pistons mounted to slide radially in a rotor. Reciprocating motion of the pistons is brought about by means of connecting rods extending between each piston and a shaft displaced from the center of rotation of the rotor. Two chambers are formed in each piston, separated by vanes in the rotor, over which the pistons slide. As these chambers pass intake slots, one is filled with fuel while the other is filled with air. The outer housing includes a section, which surrounds the intake portion of the engine, fitting tightly around the rotor. The remaining section is an arc coaxial with the center of the shaft, having a smaller diameter than the outside of the rotor, but extending outward therefrom because of the displacement between the two centers. This section forms a combustion chamber, having a spark plug and one end and an exhaust port at the opposite end.

Another way to build a rotary internal combustion engine, which has met with commercial success, is to mount a rotor so that it turns at a first rotational speed about an eccentric portion of a shaft turning at a second rotational speed. This method is described in U.S. Pat. No. 2,880,045, issued to F. Wankel on Mar. 31, 1959, in U.S. Pat. No. 2,988,008, issued to F. Wankel on Jun. 13, 1961, and in U.S. Pat. No. 2,947,290, issued to W.G. Froede on Aug. 2, 1960. The two rotational motions are tied together, for example, by a gear with internal teeth on the rotor meshing with a gear with external teeth on the shaft. The rotor has several (typically three) equally spaced, outward extending apex portions where seals are placed to operate on an internal surface of a stationary housing. For the seals to operate properly, the internal surface must have the shape which is generated by the kind of apex motion. Thus, it must have an epitrochoidal shape, typically with two lobes. During rotation, the space between the rotor and the inner surface of the housing is formed into several working chambers compressing trapped gasses and allowing their expansion as required in the operation of a four stroke cycle engine. Primary advantages of the Wankel type of engine are its simplicity, compared to conventional reciprocating engines, and its lack of reciprocating parts, which allows its operation at high rotational speeds. A primary disadvantage of the Wankel type of engine is the difficulty of producing the complex shapes of the rotor and the inner housing surface. A method for machining such surfaces is disclosed in U.S. Pat. No. 2,870,578, issued to O. Baier on Jan. 27, 1959.

Air compressors and various types of pumps use many of the mechanisms also used in internal combustion engines. For example, reciprocating compressors use pistons driven by crankshafts and valve mechanisms. U.S. Pat. Nos. 2,880,045 and 2,988,008 to Wankel, describe the application of rotary piston machines in pumps or compressors as well as in internal combustion engines. U.S. Pat. No. 3,269,371, issued to K. Eickmann on Aug. 30, 1969, describes a rotary pump having an inner section in which vanes slide radially within slots in a rotor, engaging an inner surface of a casing ring having an inner diameter greater than the outer diameter of the rotor. The rotor and casing ring turn together, but the center of rotation of the casing ring is displaced from that of the rotor, so that fluid working spaces, bounded by adjacent vanes, by the outer surface of the rotor, and by the inner surface of the casing ring, are formed to vary in volume with the rotation of the rotor. The casing ring also includes a number of shafts, extending axially in each direction into circumferential slots in pistons mounted to slide radially within the rotor, so that these pistons are driven in a reciprocating motion by the eccentricity of the casing ring with the rotation of the rotor, forming additional fluid working chambers inside and outside the pistons. When the device is operated as a pump, fluid is brought through a hollow portion of the rotor shaft, into the chambers associated with the central inner section, through internal slots into other working chambers, and outward through a second hollow portion of the rotor shaft.

SUMMARY OF THE INVENTION

In accordance with one aspect of this invention, there is provided an internal combustion engine having a stationary housing having a housing interface surface with a housing opening extending from the housing interface surface and a rotor having a rotor interface surface. The rotor is mounted for rotation in the housing with the rotor interface surface being juxtaposed to the housing interface surface. The rotor has a rotor slot therein extending from the rotor interface surface, the rotor slot moving past the housing opening during rotation of the rotor. The engine further has a piston slideably mounted in the housing opening and a vane slideably mounted in the housing opening and displaced from the piston in a direction opposite to the rotation. Further, the engine has means for independently moving the vane and piston into the rotor slot, as the rotor slot moves adjacent to the housing opening and means for providing a combustible fuel into a region within the housing opening adjacent to the piston, the fuel undergoing combustion after the vane is moved into the slot.

BRIEF DESCRIPTION OF THE DRAWINGS

One preferred embodiment of the subject invention is hereafter described, with specific reference being made to the following Figures, in which.

FIG. 2 is an exploded isometric view of the rotor of a rotary internal combustion engine, along with a cover providing bearing support thereto.

FIG. 3 is a cross-sectional elevation view of the intake port and intake valve portion of the engine, shown in the direction of section line III—III in FIG. 1.

FIG. 4 is a cross-sectional elevation view of the oil reservoir portion of the engine, shown in the direction of section line IV—IV in FIG. 1.

FIG. 9 is an elevation view similar to part of FIG. 5, showing the engine during the expansion portion of an operational cycle.

FIG. 10 is a cross-sectional elevation view of a version of a rotary internal combustion engine having one piston and a rotor with three rotor slots.

FIG. 11 is a schematic view of a distributor mechanism for the engine shown in FIG. 10.

FIG. 12 is a cross-sectional elevation view of a version of a rotary internal combustion engine having three pistons and a rotor with three rotor slots.

FIG. 13 is a cross-sectional elevation view of a version of a rotary internal combustion engine having three pistons and a rotor with four rotor slots.

FIG. 14 is a schematic view of a distributor mechanism for the engine shown in FIG. 12.

FIG. 15 is a partial cross-sectional elevation view of an internal combustion engine having a vertical drive shaft in accordance with an alternate embodiment.

DESCRIPTION OF THE PREFERRED EMBODIMENT

Figure 1:
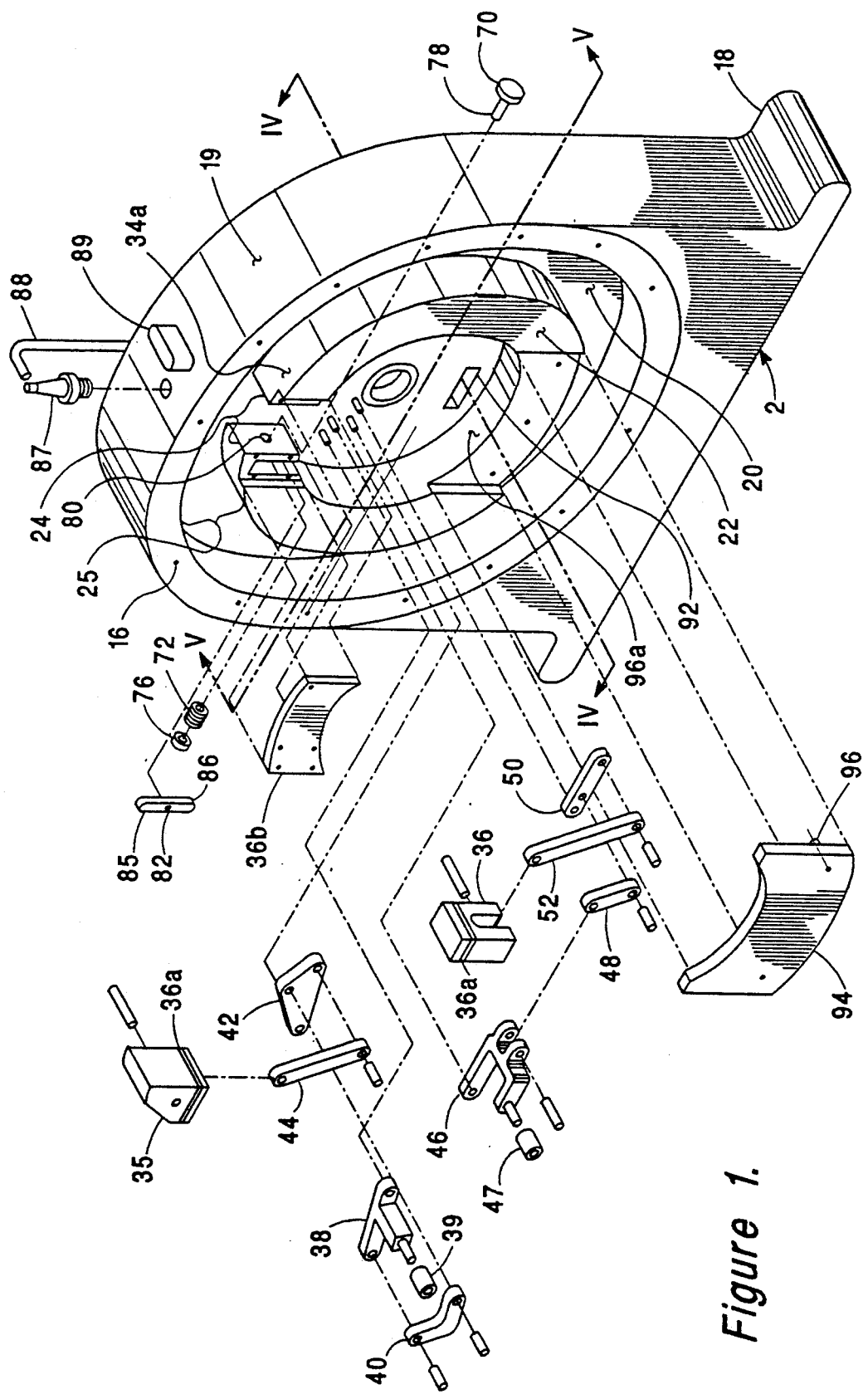
FIG. 1 is an exploded isometric view of the stationary housing of a rotary internal combustion engine, along with piston and vane mechanisms mounted therein.

Various elements and features of a rotary internal combustion engine 1 constructed in accordance with the present invention will now be with reference to FIGS. 1 through 4. Engine 1 includes, as principle parts, a stationary housing 2, shown in FIG. 1 and a rotor 4 and a cover 6, both of which are shown in FIG. 2. Rotor 4 is firmly attached to a shaft 8, which extends through bearing 10 in stationary housing 2 and through bearing 12 in cover 6. Cover 6 is firmly attached to housing 2 by means of a number of bolts 14 engaging threaded holes 16 through holes 15. Shaft 8 is free to rotate in bearings 10 and 12, while other types of lateral motion of the shaft are constrained by the bearings 10 and 12. Shaft 8 may extend beyond either or both bearings 10 and 12, for attachment to loads to be driven by the rotation of shaft 8 and for attachment to a conventional type of starter motor assembly to provide rotation required to start the operation of the engine.

Referring to FIG. 1, stationary housing 2 includes a pedestal portion 18, which may be fastened to a floor or other suitable support. In addition, housing 2 includes an outer shell portion 19, which extends around the engine as a cover and a backplate portion 20, which extends across engine 1, except as required for the attachment therein of bearing 10. A housing hub 22 extends inward from backplate portion 20 coaxially around bearing 10, being interrupted by a radial housing slot 24. Circumferential slot 25 is thus formed and extends between housing hub 22 and outer shell portion 19.

Referring to FIG. 2, rotor 4 includes a rotary backplate portion 26, and a rotor ring 28, which extends coaxially around shaft 8 to be interrupted by a radial rotor slot 30. When shaft 8 is assembled in bearings 10 and 12, rotor ring 28 turns in circumferential slot 25 of stationary housing 2. Rotor 4 also includes a cam hub 31, extending centrally inward around shaft 8. Cam hub 31 also includes an outer cam surface 32, an outer cam groove 33 and an inner cam groove 34.

The arrangement shown in FIGS. 1 and 2 provides an interface where relative motion occurs between stationary housing 2 and rotor 4. This interface occurs between housing interface surface 34a, which is the cylindrical outer surface of housing hub 22, and adjacent rotor interface surface 34b, which is the cylindrical inner surface of rotor ring 28. In a manner which will be described hereafter, various events required to propel rotor 4 occur at the interface as rotor slot 30 passes housing slot 24.

Engine 1 also includes a piston 35 and a vane 36 moving radially in a reciprocating motion within housing slot 24 of stationary housing 2, and into rotor slot 30 of rotor 4 when these slots are in alignment. Piston 35 and vane 36 are also provided on each side with compression or packing strips 36a, which function in the manner of piston rings in a conventional reciprocating engine to secure a tight seal. Housing sealing plate 36b and rotor sealing plate 36c are also bolted in place in these structures to aid both in sealing and in providing bearing surfaces for the sliding motion of piston 35 and vane 36. The radial motion of piston 35 and vane 36 is controlled by the angular motion of rotor 4 as transmitted from cam grooves 33 and 34 through linkages and drive arms pivoted on posts 37 extending inward from backplate portion 20 of stationary housing 2.

Specifically, the radial position of piston 35 is determined by the angular position of cam follower arm 38, which includes a roller 39 operating in outer cam groove 33, such motion being transmitted through a pivotably attached linkage comprised of intermediate link 40, piston drive arm 42, and piston drive link 44. Similarly, the radial position of vane 36 is determined by the angular position of cam follower arm 46, which includes a roller 47 operating in inner cam groove 34, such motion being transmitted through a pivotably attached linkage comprised of intermediate link 48, vane drive arm 50, and vane drive link 52. Cam follower arms 38 and 46, and drive arms 42 and 50 are pivotably attached to backplate portion 20 by means of inward extending posts 37. These linkages are thus configured particularly to amplify the motion imparted by the cam grooves 33 and 34, so that relatively small radial displacements of within these grooves result in relatively large displacements of piston 35 and vane 36.

Referring now to FIG. 3, engine 1 also includes an intake port 66, extending outward within stationary housing 2 to be attached externally to a source (not shown) of air mixed with vaporized fuel. An example of such of such a source is a carburation system well known in the art, which may also be attached to a pressurizing system, such as a supercharger. An adjacent combustion chamber 68 is formed outside the surfaces of piston 35 and vane 36, within housing slot 24 and rotor slot 30. The connection between intake port 66 and combustion chamber 68 is opened and closed by the translational movement of intake valve 70. Valve spring 72, which is compressed between spring seat surface 74 of stationary housing 2 and compression plate 76 of valve stem 78, normally holds intake valve 70 closed against valve seat surface 80.

Referring again to FIGS. 1 and 2, valve drive arm 82 is centrally and pivotably mounted within a valve drive slot 84 adjacent to housing slot 24 of stationary housing 2. Valve drive arm 82 includes an outer end 85, which operates against valve stem 78 and an inner end 86, which operates against outer cam surface 32 of rotor 4. Outward motion of cam surface 32 thus causes the rotation of drive arm 82 so that intake valve 70 is pushed away from valve seat surface 80, opening the valve so that intake port 66 is connected with combustion chamber 68.

Stationary housing 2 includes, adjacent to combustion chamber 68, a standard spark plug 87 connected by means of a high voltage wire 88 to a distributor or electronic ignition system (not shown), which may be built in accordance with well known principles of design and manufacture. Spark plug 87 provides a timed ignition source into combustion chamber 68 through a hole extending through outer shell portion 19. Stationary housing 2 also includes an exhaust port 89 extending through outer shell portion 19.

Following conventional engine design and operation practices, lubrication must be provided to various surfaces where relative motion occurs under loading, such as the cam grooves and linkage pivots. It is also desirable to prevent or minimize the leakage of oil into the portions of housing slot 24 and rotor slot 30, outside the piston 35 and vane 36, where combustion occurs. An example of how these objectives can be achieved will now be discussed with reference to FIG. 4, which shows an external oil reservoir 90 added to stationary housing 2, communicating with a smaller internal oil reservoir 91 through an aperture 92 in backplate portion 20 of housing 2. Reservoirs 90 and 91 are filled with a suitable lubricating oil to a level 93, at which the lower portion of cam hub 31 is pulled through the oil in reservoir 91 by the rotation of rotor 4, picking up a coating of oil on the outer cam surface 32 and on cam grooves 33 and 34. Additional lubrication is provided by a oil pump (not shown) driven by shaft 8, pumping oil from external reservoir 90 upward to be released through a number of nozzles (not shown) in the vicinity of sliding piston 35, vane 36, and the pivots of the linkages moving these parts. Oil from these nozzles then runs, falls, or is carried cam hub 31 back downward into inner reservoir 91, promoting a circulation of oil between reservoirs 91 and 90 through aperture 92 while maintaining the oil level 93.

Reservoir plate 94 is bolted, using bolts 95 engaging internally threaded studs 96 welded to the plate 94, to housing hub 22 to form a side of inner reservoir 91. Without plate 94, oil would spill downward into rotor slot 30 as slot 30 passed the reservoir. As shown in FIG. 1, reservoir plate 94 is extended upward and outward on each side to assure the oil is carried by plate 94 and by inner surface 96a of housing hub 22 into internal reservoir 91. Holes 97 are provided in rotor backplate portion 26 of rotor 4 in alignment with internally threaded studs 96, so that backplate can be brought into position fastened to rotor 4 as the engine 1 is assembled, before bolts 95 are installed from the opposite side.

While means for cooling the engine 1 have not been shown in particular detail, a number of engine cooling techniques well known in the art could easily be applied to this configuration. For example, water from a fan cooled radiator could be circulated through cavities in stationary housing 2. In some applications, air cooling of the engine may be adequate, with fins extending from stationary housing 2, particularly near the combustion area around spark plug 87.

The operational cycle of engine 1 includes a base portion, in which piston 35 and vane 36 are held inward to clear rotor ring 28. As the rotation of rotor 4 begins to bring housing slot 24 and rotor slot 30 into alignment, an intake portion begins with the opening of intake valve 70 to allow a mixture of air and vaporized fuel to enter a combustion chamber adjacent to piston 35. Vane 36 is then moved outward to bisect rotor slot 30, so that, on the piston side of vane 36, slot 30 becomes part of the combustion chamber, while on the other side of vane 36, slot 30 is connected to an exhaust port 89 for the removal of gasses resulting from previous combustion. Intake valve 70 then closes, and piston 35 moves outward in a compression portion of the cycle, greatly reducing the volume of the combustion chamber and causing a significant rise in the temperature and pressure of the air and fuel mixture. At or near the completion of the piston motion, spark plug 87 is fired to ignite the mixture. The burning gasses are allowed to expand in a subsequent expansion portion of the cycle, pushing on leading surface 97 of rotor slot 30 as it rotates onward, away from the piston. The force produced by the action of these expanding gasses on surface 97 produces the torque developed by engine 1. As the trailing surface 98 of rotor slot 30 approaches the outward extended vane, exhaust gasses remaining between the vane and surface 98 are pushed out exhaust port 89.

The operation of engine 1 through various portions of a cycle will now be discussed in greater detail with reference of FIGS. 5 through 9. Each of these Figures, except for FIG. 8, is a partial cross-sectional elevation of the engine 1, as viewed in the direction of section line V—V in FIG. 1. Thus, each of FIGS. 5 through 9 is a partial cross-section of a plane lying between the flat surface of housing hub 22 of stationary housing 2 and rotary backplate portion 26 of rotor 4. In order to show the positions of piston 35 and vane 36 more clearly, FIGS. 5 through 9 are shown with housing sealing plate 36b removed. Rotor ring 28 and cam hub 31 of rotor 4 extend through the plane of the cross-section. In order to show the linkages associated with piston 35 and vane 36, a portion of cam hub 31 is shown as being cut away. In order to show the timing relationships between cam grooves 33 and 34 and these linkages, the center of outer cam groove 33 is represented by a phantom line 33', while the center of inner cam groove is represented by a phantom line 34'.

Figure 5:
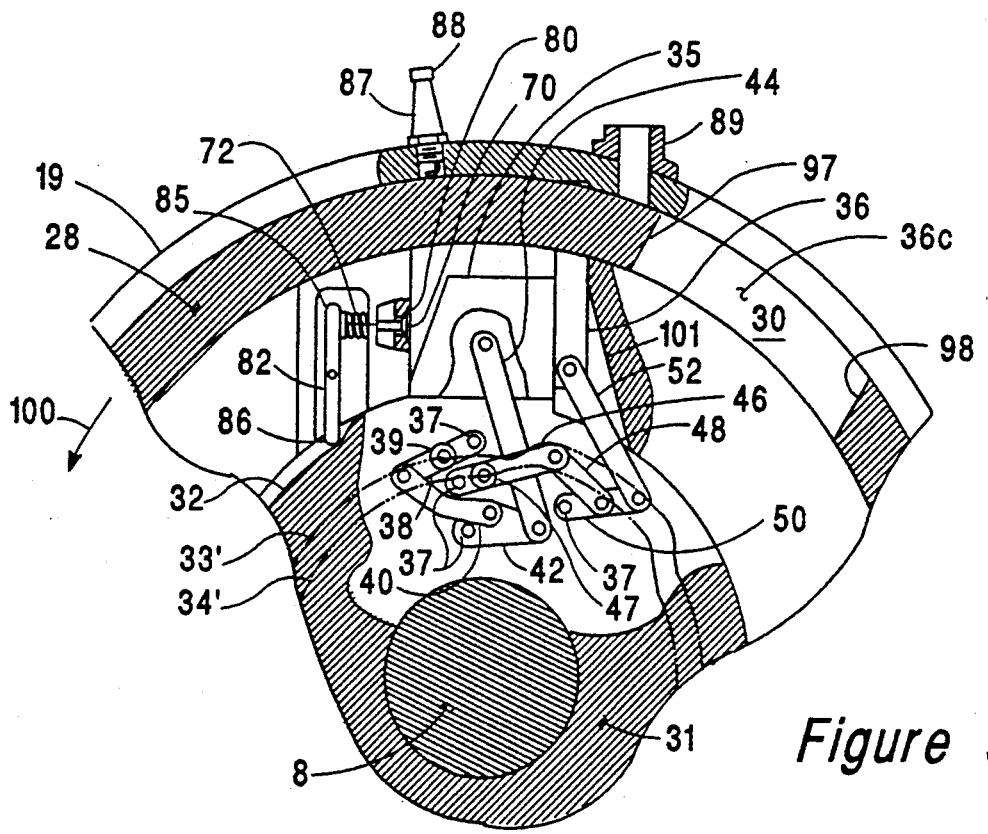
FIG. 5 is a partial cross-sectional elevation view of the engine during the base portion of an operational cycle, shown in the direction of section line V—V in FIG. 1.

Referring first to FIG. 5, the base portion of the operational cycle is shown with piston 35 held inward and roller 39 is operating in the portion of outer groove 33 at its minimum radius. Similarly, vane 36 is held inward and roller 47 is operating in the portion of inner groove 34 at its minimum radius. In these positions, piston 35 and vane 36 clear rotor ring 28 of rotor 4, which rotates in he direction of arrow 100, while vane drive link 52 extends tangentially into a corner slot 101 within housing hub 22. During the base portion of the cycle, valve 70 is closed against valve seat 80, since inner end 86 of valve drive arm 82 is operating on a portion of the surface of outer cam surface 32 at its minimum radius.

Figure 6:
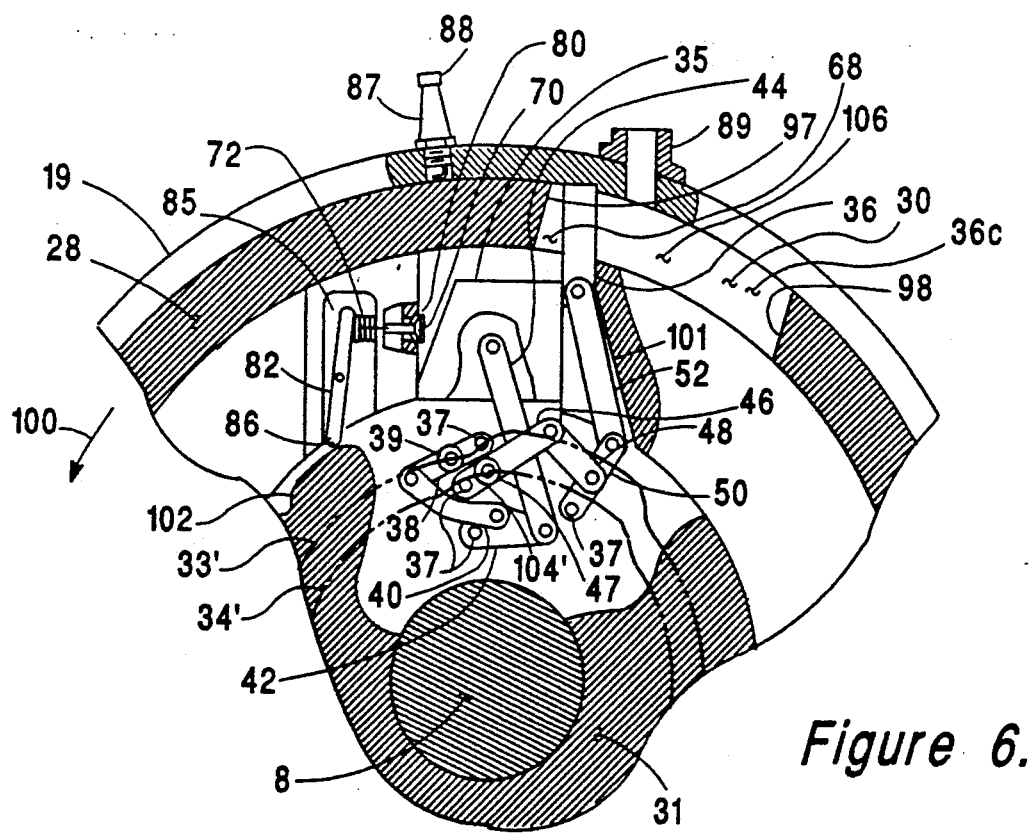
FIG. 6 is an elevation view similar to FIG. 5, showing the engine during the intake portion of an operational cycle.

Referring next to FIG. 6, to begin the intake portion of the operational cycle, an outwardly ramped portion 102 of outer cam surface 32 rotates in the direction of arrow 100 past inner end 86 of valve drive arm 82, causing arm 82 to rotate and compress valve spring 72 to thereby open valve 80. By this point in time, the leading surface 97 of rotor slot 30 has rotated past vane 36, which is moved outward as outwardly ramped portion 104 of inner cam groove 34 (represented by portion 104' of phantom line 34' in FIG. 6) rotates past roller 47 of cam follower arm 46. The consequential rotation of cam follower arm 46 pulls intermediate link 48, rotating vane drive arm 50 to push vane 36 outward by means of vane drive link 52. During the intake portion of the cycle, piston 35 is held inward and a mixture of fuel and air is allowed to enter the combustion chamber 68 being formed adjacent to piston 35. The outward motion of vane 36 separates combustion chamber 68 from an exhaust chamber 106 in the portion of rotor slot 30 on the opposite side of vane 36. Exhaust chamber 106, which is normally filled with exhaust products from a previous combustion cycle, is opened to exhaust port 89, so that subsequent rotation of rotor 6, sweeps these products out through port 89 by means of the motion of trailing surface 98 of rotor slot 30.

Figure 7:
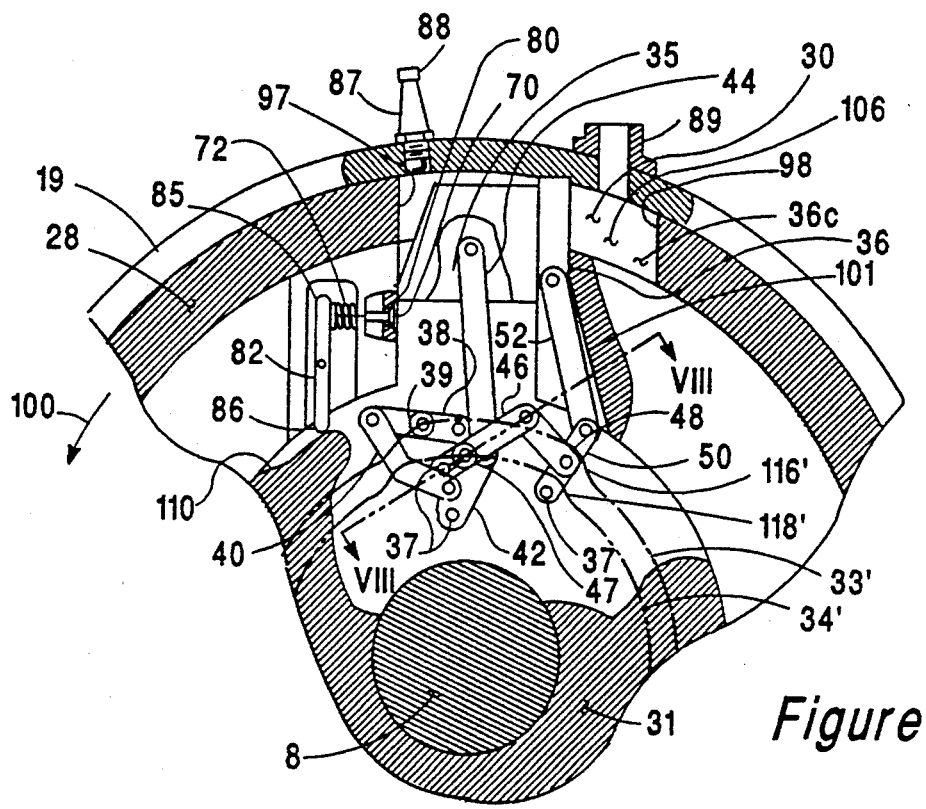
FIG. 7 is an elevation view similar to FIG. 5, showing the engine following the compression portion of an operational cycle.
Figure 8:
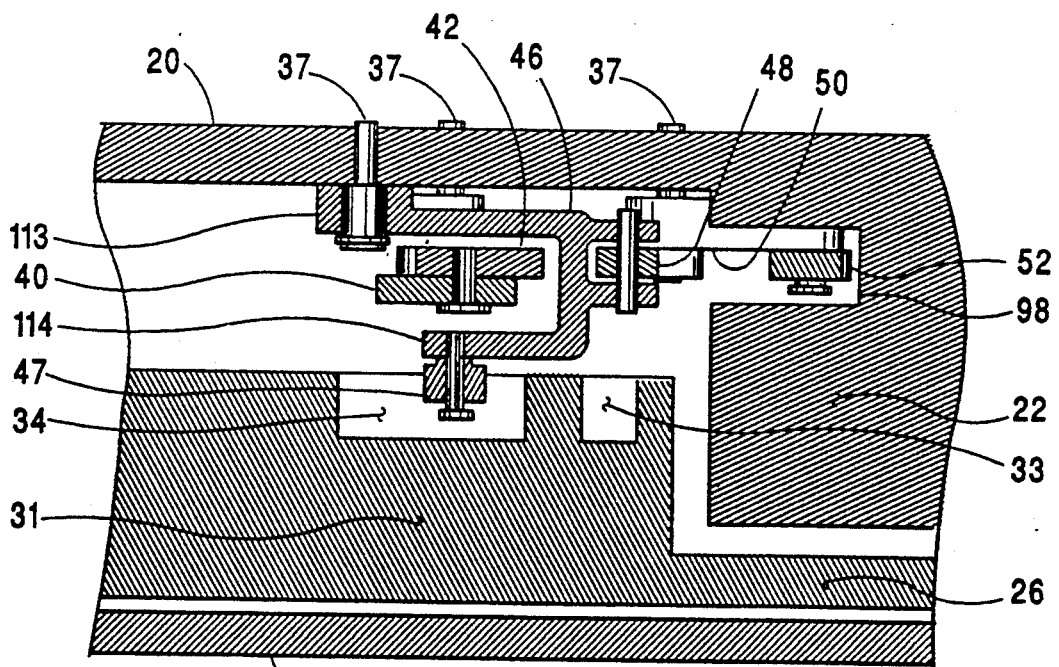
FIG. 8 is a cross-sectional elevation view of piston and vane drive linkages, shown in the direction of section line VIII—VIII in FIG. 7.

Referring now to FIG. 7, to begin the compression portion of the cycle, an inwardly ramped portion 110 of outer cam surface 32 rotates in the direction of arrow 100 past inner end 86 of valve drive arm 82, allowing valve spring 72 to close intake valve 70. Then an outwardly ramped portion 112 of outer cam groove 33 (represented by portion 112, of phantom line 33 FIG. 7) is rotated past roller 39 of cam follower arm 38, so that the rotation of arm 38 pulls on intermediate link 40, rotating piston drive arm 42 to push piston 35 outward by means of piston drive link 44. During the compression portion of the cycle, vane 36 remains held in its outward position. The outward motion of piston 35 compresses the mixture of air and fuel vapor in the combustion chamber 68 until it has a volume of only about one twelfth its volume during the intake portion. The temperature of the mixture is thus caused to rise dramatically during the portion of the cycle.

Referring next to FIG. 8, which is a partial cross-sectional elevation shown in the direction of section line VIII—VIII of FIG. 7, mechanical interferences between the linkages associated with piston 35 and vane 36 are avoided during these motions by the bifurcation of vane driving cam follower arm 46. Specifically, a pivot section 113 lies adjacent to backplate portion 20 of stationary housing 2 for pivotable attachment to a post 37 extending inward therefrom, while roller section 114 lies adjacent to cam hub 31 with roller 47 operating in inner cam groove 34. Piston drive arm 42 and intermediate link 40 operate between these bifurcated sections.

At or near the end of the compression portion of the cycle, a high voltage pulse is applied to sparkplug 87 through wire 88. The pulse may be generated by a conventional type of distributor system or by a standard type of electronic ignition system. Since the pulse is to occur always at the same position in the rotation of rotor 4, the distributor or electronic ignition system can be operated from the rotation of shaft 8 to achieve proper timing. The high voltage pulse causes the generation of a spark at the gap 115 of spark plug 87, which ignites the compressed mixture of fuel and air in combustion chamber 68, beginning the expansion portion of the cycle, in which the heated and burning gasses in combustion chamber 68 are allowed to expand.

Referring to FIG. 9, the expansion portion of the cycle occurs as continued rotation of rotor 4 in the direction of arrow 100 moves leading surface 97 of rotor slot 30 away from piston 35, increasing the volume of combustion chamber 68. During the expansion of the products of combustion within the chamber, pressure against leading surface 97 produces a torque on rotor 4, which may be transmitted through shaft 8 to perform useful mechanical work, such as moving a load. During the expansion portion of the cycle, the rotation of trailing surface 98 of rotor slot 30 continues to sweep exhaust products from a previous combustion cycle outward through exhaust port 89.

As trailing surface 98 of rotor slot 30 approaches vane 36, inwardly ramped portion 116 of outer cam groove 33 (represented in FIG. 7 as portion 116' of phantom line 33') passes roller 39 of cam follower arm 38, so that the linkage between arm 38 and piston 35 moves the piston inward. Similarly, inwardly ramped portion 118 of inner cam groove 34 (represented in FIG. 7 as portion 118' of phantom line 34') passes roller 47 on cam follower arm 46, so that the linkage between arm 46 and vane 36 moves the vane inward. Thus, as the expansion portion of the operational cycle is completed, the elements are returned to the inward positions during the base portion of the cycle, which is discussed above with reference to FIG. 3.

In a manner of example, the piston 35 has been shown to move into the rotor slot 30 during the compression portion of the operational cycle. It should be understood that, in other configurations within the scope of this invention, piston 35 might be provided with a relatively long movement within the housing slot 24, so that sufficient compression could be obtained without motion of the piston into the rotor slot 30.

This invention may be applied in various configurations having multiple sets of pistons and vanes sliding in housing slots equally spaced around the circumference of a stationary housing and/or having multiple rotor slots equally spaced around the rotor. In each such configuration, each housing slot includes an intake valve operating, as previously described, and pistons and vanes are driven by linkages, as previously described. The camming surfaces of the rotor include a number of actuating sectors equal to the number of rotor slots so that the operation of each intake valve and the reciprocating movement of each piston and vane occurs as each rotor slot moves adjacently to each housing slot with the rotation of the rotor. In such configurations, the number of power producing individual expansion cycles occurring per revolution of the rotor is equal to the product of the number of housing slots times the number of rotor slots.

A first variation in the basic configuration of engine 1 is engine 119, which has a single housing slot and a number of rotor slots, to produce a number of expansion cycles per revolution of the rotor equal to the number of rotor slots. The resulting improvement in performance is made without a corresponding increase in cost or complexity in that there is still only one valve, one piston and one vane. A comparison can be made with the conventional two stroke cycle reciprocating engine, which provides only one expansion cycle per piston and per revolution of the crank shaft, or with a four stroke cycle reciprocating engine, which produces an average of only one half an expansion cycle per piston and per revolution of the crank shaft.

A second variation in the basic configuration of engine 1 is engine 130, which has an equal number of inner and rotor slots. This configuration has the significant advantage of providing expansion cycles per revolution increasing with the square of the number of pistons. In conventional reciprocating engines, the number of individual expansion cycles per revolution of the crankshaft varies directly with the number of pistons. Therefore, this configuration of the invention has the capability, by increasing the number of pistons, of increasing torque and power without having a corresponding increase in engine size and weight. Furthermore, in this configuration, due to symmetry, bearing reaction forces due to acceleration of parts and fuel combustion tend to cancel each other.

A third variation in the basic configuration of engine 1 is engine 134, which has a first number of housing slots and a second number of rotor slots, where the second number is one greater than the first number. This configuration has the advantage of producing a very smooth torque output. The number of expansion cycles per rotor revolution is equal to the product of the first and second numbers, but they occur individually at equally spaced times. However, bearing reaction forces in this configuration are not balanced as they are in the second configuration.

The application of the principles of this invention to engine designs having multiple pistons and/or with multiple rotor slots will now be discussed with reference to the specific examples shown in FIGS. 10 through 14. This invention offers particular advantages in such an application, being adaptable to engines producing high torque and power outputs, compared to conventional engines, without corresponding increases in size and complexity. Each FIG. 10, 12, and 13, is a cross-sectional transverse elevation taken through the cam hub and rotor ring with outer cover plates removed to show the operation of pistons and vanes. Piston and vane drive linkages are not shown because of similarity to such features previously described in reference of FIGS. 1 through 9. Each FIG. 11 and 14, is schematic view showing the distributor portion of a circuit to operate the spark plug(s) of an engine, as will be described. Reference numerals for parts shown in FIGS. 1 through 9 are repeated where these parts are similar or identical to the corresponding parts shown in FIGS. 10 through 14.

Referring first to FIG. 10, a rotary internal combustion engine 119 is provided with a rotor 120, turning in the direction of arrow 121 in which rotor ring 122 has three equally spaced slots 123. Each of the grooves 124a in cam hub 124 and outer cam surface 125 have outwardly extended portions corresponding to each rotor slot 123. Except for these differences, and changes which must be made in the distributor or electronic ignition system, engine 119 can be similar or identical to engine 1, which has previously been described in reference to FIGS. 1 through 9, using in particular the linkages described to drive the piston and vane radially.

The timing conditions for the motions of piston 35, vane 36, and an intake valve (not shown) are as previously described for corresponding parts in single piston engine 1, so that the piston 35 and vane 36 slide radially within housing slot 24 and within each rotor slot 123 as these slots rotate into alignment. Engine 119 has the advantage, compared to that of engine 1, of providing three expansion cycles to produce power, instead of only one, per revolution of the rotor. A lubrication system as previously discussed for engine 1 in reference to FIGS. 1 and 3 can also be used for engine 119, and cooling can be arranged as previously discussed by arranging for the flow of water through channels in stationary housing 2. With all other conditions equal, engine 119 should thus produce three times the power as engine 1. This type of configuration is generalized to encompass engines of this type having single pistons and rotors with two or more rotor slots.

Referring to FIG. 11, the distributor portion of an ignition system to operate engine 119 includes a distributor rotor 126 having three equally spaced contact points 122 driven past a single stationary contact point 128, connected through an appropriate circuit to spark plug 90. Distributor rotor shaft 129 is driven in synchronization with shaft 8 at the same speed.

Referring next to FIG. 12, a rotary internal combustion engine 130 is provided with a stationary housing 131 in which housing hub 132 has three equally spaced housing slots 133, and with a rotor 120, identical to the corresponding part in engine 119, having an rotor ring 122 with three equally spaced rotor slots 123. Radially sliding pistons 35, and radially sliding vanes 36, are moved in each of these housing slots 133 and into rotor slots 123 as these rotor slots are aligned with the housing slots, in accordance with grooves 124a in cam hub 124 of rotor 120. Linkages similar or identical to those previously described as a part of single piston engine 1 operate between an outer groove and each piston 35 and between an inner groove and each vane 36. Engine 130 includes an intake port (not shown) with an intake valve mechanism (not shown) operated by an outer cam surface 125 in a manner similar to that described as a part of the operation of single piston engine 1.

Each of the grooves in cam hub 124 and outer cam surface 125 have outwardly extended portions corresponding to each rotor slot 123, and the timing conditions for the motions of pistons 35, vanes 36, and intake valves (not shown) are as previously described for corresponding parts in single piston engine 1. A spark plug 87 is provided for each piston location in housing hub 132, and a conventional type of distributor or electronic ignition system is used to provide a high voltage pulse to each such spark plug as the corresponding piston 35 is completes the compression portion of its cycle. An exhaust port 133a is provided, displaced from the position of each vane in a direction opposite to direction of rotation 100, so that the bifurcation of the space within each rotor slot 123 by the outward motion of the vane 36 can be most effectively used to clear exhaust gasses from the slot with the rotation of the rotor.

The configuration illustrated by engine 130 can be generalized to include engines having two or more equally spaced pistons and an equal number of equally spaced rotor slots. Due to symmetry in engine 130, the cycles for all piston positions occur simultaneously, so all sparkplugs are fired at the same time. Thus, the type of distributor previously discussed for engine 119 in reference to FIG. 11 can also be used for engine 130. Thus, one torque pulse resulting from the expansion cycles of the piston positions occurs per revolution of the rotor shaft 129. A primary advantage of the configuration illustrated by engine 130 lies in the dynamic balance achieved by the simultaneous operation of the cycles in a symmetrical configuration. The forces due to acceleration of the pistons 35 and the vanes 36, as well as the radial forces due to the combustion process are balanced to minimize vibration of the engine.

Referring to FIG. 13, in another type of configuration, an internal combustion engine 134 includes a rotor 135 having four equally spaced rotor slots 136, 137, 138, and 139. The grooves in cam hub 140 and outer cam surface 141 have four outwardly extending sections corresponding to the four rotor slots. Except for differences in the ignition system, engine 134 can otherwise be identical to engine 130, as previously described in reference to FIG. 12. However, the resulting operation of these engines is quite different. As shown in FIG. 13, rotor 135 has rotated to a position in which piston 35a has just completed its outward motion, in alignment with rotor slot 136. Since piston 35b is spaced one third of a revolution from piston 35a, and since rotor slot 137 is spaced one fourth of a revolution from slot 136, the rotation of rotor 135 in the direction of arrow 121 through the difference in these angles, one twelfth of a revolution, will bring piston 35a to a position of having just completed its outward motion in slot 137. Also, as shown in FIG. 13, piston 35c is spaced one sixth of a revolution from slot 138, so the rotation of rotor 135 through one sixth of a revolution will bring piston 35c to a similar position in slot 138. Finally, as shown in FIG. 12, piston 35a is spaced one quarter of a revolution from slot 139, so the rotation of rotor 135 through one quarter of a revolution will bring piston 35a again to the position in which it is shown, starting a new, similar cycle.

Thus, as the rotor is turned, an expansion cycle occurs during each one twelfth of a revolution, producing and extremely smooth torque on output shaft 141. This has a great advantage of minimizing the vibrational effects of pulses in the drive torque. However, the reaction forces caused by the acceleration of components within the engine and by the combustion of fuel are not balanced, as they are in the configuration described with respect to FIG. 10.

Referring to FIG. 14, the distributor portion of an ignition system to operate engine 134 includes a distributor rotor 141a having four equally spaced contact points 141b, driven past three stationary contact points 141c, which are connected through appropriate circuits to the three spark plugs 87. Rotor 141a is driven in synchronization with engine shaft 141d at the same speed.

Various other possible configuration similar to engine 134 can be generalized to include engines having a first number of rotor slots and a second number of housing slots, where these first and second numbers differ by one. Generally, it is more desirable to increase the number of rotor slots, since this can be done more economically, without adding moving parts.

The type of lubrication system which can be used in one of these engines 130 or 134 depends on a number of factors. If there is enough space between the lowest two pistons for an oil reservoir, the type of system described above in reference to FIGS. 1 and 3. If this is not possible, the alternative of mixing oil and gasoline, to provide lubrication using methods commonly employed in two stroke cycle reciprocating engines, may be implemented. The problem of providing lubrication for internal combustion engines having reciprocating pistons arrayed around a cylindrical structure with a horizontal axis has been solved in the development of radial piston engines for aircraft; the methods used in this application could be applied to the lubrication of these engines 130 and 134.

Referring now to FIG. 15, in an alternate embodiment of the invention, an engine 142 includes a rotor 144 attached to a vertical shaft 146, which is in turn rotatably mounted in a lower bearing 148 in stationary housing 150 and upper bearing 152 in housing cover 154. Stationary housing 150 includes a cylindrical housing interface surface 156, from which a number of housing slots 158 extend radially inward. Rotor 144 includes a cylindrical rotor interface surface 160 from which a number of rotor slots 162 extend radially outward. Rotor interface surface 160 rotates outwardly adjacent to housing interface surface 156. Each housing slot 158 contains a piston 164 which is driven outward into each rotor slot 162 passing the location of the piston during the rotation of rotor 144. The piston motion is forced by an outwardly ramped portion of piston cam groove 166, which pivots piston cam follower arm 168 about pivot pin 170 in upstanding flange 172 of stationary housing 150. The motion of arm 168 pulls intermediate link 174, in turn rotating piston drive arm 178, which is pivoted at pin 180 in flange 172, thereby pushing piston 164 outward by means of connecting link 182.

Similarly, a vane (not shown) is located adjacent to each piston 164, spaced from each piston 164 within stationary housing 150 in a direction opposite to the rotational direction of rotor 144, to be moved outward into rotor slot 162 by an outwardly ramped portion of vane cam groove 184, through the rotation of vane cam follower arm 186, which is pivotably mounted to flange 172 at pin 188. Each housing slot 158 also includes an intake valve 190, normally held closed by a compression spring 192, which is opened by a downwardly ramped portion of valve cam surface 194 rotating valve arm 196 about its pivot 198. When intake valve 190 is moved upward in this manner, housing slot 158 is connected to an intake port 200, through which a combustible mixture is provided.

The operation of engine 142 proceeds in accordance with the operational cycles previously discussed for engine 1, particularly in reference to FIGS. 5 through 9. That is, as each rotor slot 162 passes each housing slot 158, the vane (not shown) is moved to bifurcate rotor slot 162. Then intake valve 190 is opened and returned, and piston 164 is moved outward to compress a combustible gas mixture. Then a spark plug 201 produces a spark to ignite the mixture, which subsequently expands between the vane (not shown) and a leading surface of rotor slot 162, propelling the rotor.

Engine 142 may furthermore be built in accordance with the various configurations discussed above, having multiple pistons and multiple rotor slots. Because of the orientation chosen, an internal oil reservoir can be formed where it is needed, in the cavity 202 surrounding various linkage members, regardless of the number of pistons. That is, for all engine configurations of this type, the pistons and slots are above the reservoir. Thus, engine 142 has increased designer's flexibility in design. Some forced lubrication can also be used, to pump oil through bearings 148 and 152, to splash oil upward from the reservoir into cam grooves 166 and 184, and to provide oil for the surfaces 203 of pistons 164 and of vanes (not shown) inward of compression or packing strips 204. The various portions of the oil reservoir in cavity 202, which are partially separated by intervening flanges 172, are connected by an annular opening 204, which is sealed from below by a cover plate 206.

These different configurations are exemplary of the flexibility inherent in the design of engines in accordance with this invention. Rotors with additional slots can be used to increase the torque and power outputs; the operational characteristics of an engine can be changed by changing its rotor and ignition system; and one rotor can be used in several different kinds of engines. This kind of flexibility contrasts with the design constraints of the Wankel type of rotary engine where, in an example described in U.S. Pat. No. 2,947,290 to Froede, going from a three apex rotor to a four apex rotor completely changes the shape of the stationary housing and changes the operation of the engine from that of a four stroke cycle to that of a six stroke cycle. While the Wankel type of rotary engine is well suited for high speeds, the engine of the present invention, with its ability to add pistons and slots, is particularly well suited to relatively low speed operation in which high torques are required.

This invention further indicates how a practical rotary engine can be built while avoiding the manufacturing complexities associated with formation of surfaces in the well known Wankel engine.

The preceding discussion has described various configurations in which the pistons and vanes move radially during the rotation of the rotor. Another alternate embodiment within the scope of this invention, in which the pistons and vanes move axially during rotation will now be discussed in reference to FIGS. 16 and 17.

Figure 16:
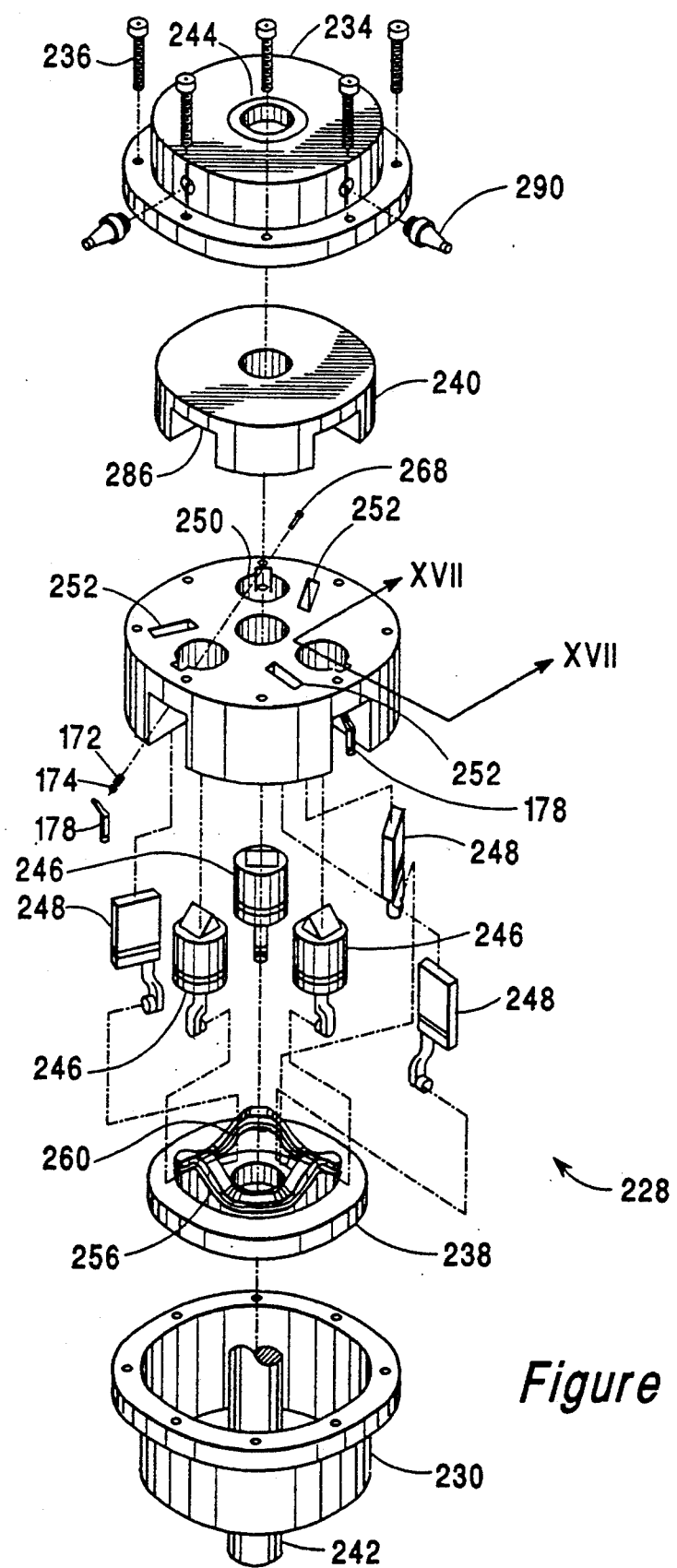
FIG. 16 is an exploded isometric view of a second alternate embodiment of the invention, in which pistons move axially.

Referring first to FIG. 16, an internal combustion engine 228 includes as stationary parts a lower housing 230, a central block 232, and an upper housing 234. These parts are assembled and fastened together with screws 236. The rotor of engine 228 includes a cam plate 238 and an impeller 240, both of which are firmly attached to a drive shaft 242, which in turn is rotatably mounted through bearings 244 in lower housing 230 and upper housing 234. Engine 228 also includes three pistons 246 and three adjacent vanes 248, mounted to move axially in cylinder holes 250 and slots 252, respectively, in central block 232 of the housing.

Figure 17:
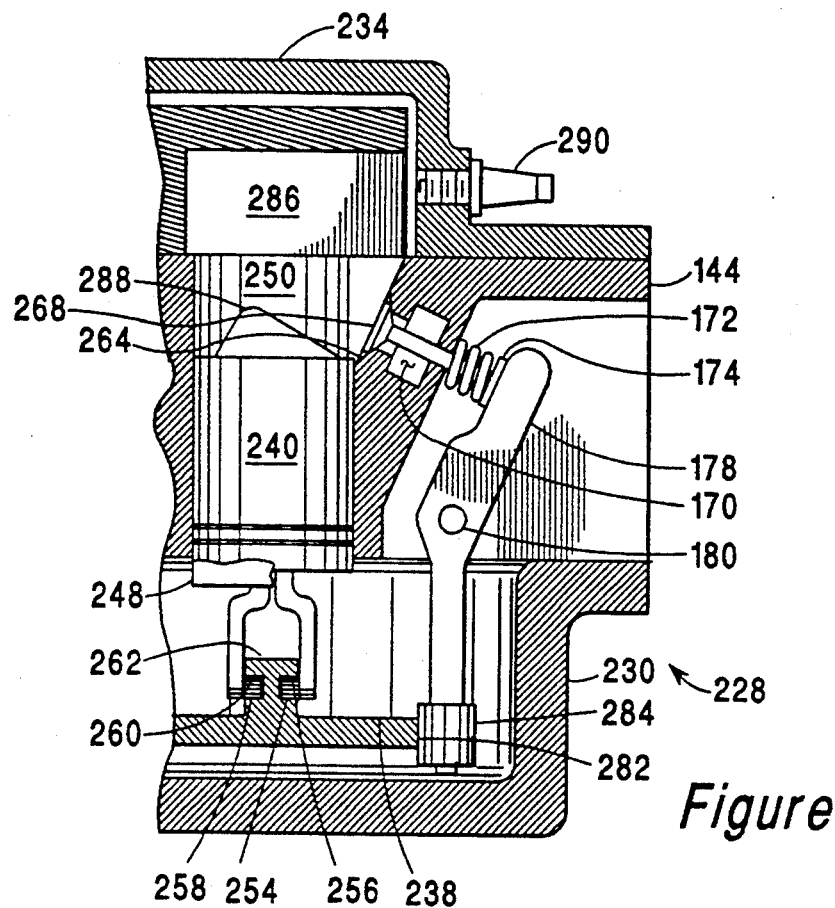
FIG. 17 is a partial cross-sectional elevation of the second alternative embodiment, shown in the direction of cross-section line XVII—XVII in FIG. 16.

Referring to FIG. 17, each piston 246 includes a rotatably mounted roller 254 operating in piston cam groove 256 of cam plate, and each vane 248 includes a rotatably mounted roller 258 operating in vane cam groove 260. Cam grooves 256 and 260 are formed within upstanding flange 262. Since flange 262 is near the outside of cam plate 238, the length of the grooves is increased to a point where the rise and fall motions available from the cam are adequate, in this example, to move pistons 246 and vanes 248 directly, without a need for an intervening linkage to multiply motion. Central block 232 also includes, extending from each cylinder hole 250, a valve seat 264, in which intake valve 268 operates, and an intake port 270, into which a combustible mixture of air and fuel is fed by conventional means (not shown), such as carburation and supercharging. Intake valve 268 is normally held shut by the compression force of valve spring 272, operating against compression plate 274 attached to the valve. Valve drive arm 278, which is pivotably mounted in central block 232 at pin 280, is used to open intake valve 268 by pushing compression plate 274, in accordance with valve drive cam 282, on which roller 284 of valve drive arm 278 operates. Impeller 240 includes three arcuate slots 286, into which pistons 246 and vanes 248 are driven, as these slots pass above these pistons and vanes with the rotation of impeller 240. The top of each piston 246 includes a wedge shaped section 288, which aids in the formation of a combustion region near spark plug 290 as the piston 246 is driven upward into an arcuate slot 286.

Compared with the multi-piston configurations previously discussed in reference to FIGS. 12 and 13, the embodiments of engine 142, as shown in FIG. 15, and of engine 228, as shown in FIGS. 16 and 17, have the advantage of providing vertical separation between the combustion areas and areas where rollers and pivots operate. Thus, in these engines 142 and 228, much of the required lubrication can be done by running parts in an oil bath from a large internal reservoir. Some pumping may be required to move oil through shaft bearings and to provide lubrication around the portions of pistons and vanes internal to packing strips. Regarding lubrication, there are many similarities between engines 142 and 228, and the reciprocating types of engines in common use today. Furthermore, since engines 142 and 228 are relatively low and wide, they can be more easily fit into many applications, such as that of the automobile engine.

While the preceding discussion relative to all embodiments and configurations has dealt with the application of this invention to a particular type of combustion process commonly employed in internal combustion engines, it is to be understood that there are a number of improvements and variations which have been made for reciprocating types of engines which can readily be applied to engines built in accordance with this invention. For example, in order to simplify the preceding discussion, the assumption has been consistently made that the intake port associated with each cylinder is connected to a source of a combustible mixture. Such a source could be a conventional carburetor in turn connected to a source of pressurized air. However, fuel injection in various forms can alternately be applied t the embodiments and configurations of this invention.

Figure 18:
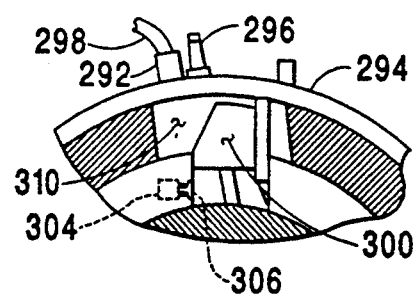
FIG. 18 is a partial cross-sectional elevation view of an embodiment of this invention using fuel injection with gasoline.
Figure 19:
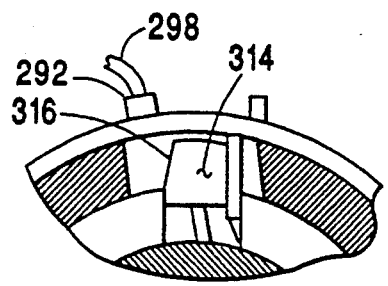
FIG. 19 is a partial cross-sectional elevation view of a diesel cycle embodiment of this invention.

Referring to FIG. 18, in a system of this invention using fuel injection with gasoline as a fuel, in an exemplary version of this alternative. A fuel injector 292, which may be one of several types well known in the art, is fastened within the housing cover 294, adjacent to a spark plug 296. Fuel injector 292, which is connected to a source of fuel by a fuel line 298, is capable of injecting fuel against the pressure developed by the compression portion of the operational cycle of the engine, in which piston 300 moves outward as rotor slot 302 moves through alignment with piston 300. In this example, the intake port 304 of the cylinder is connected to a supply of compressed air, instead of to a combustible mixture of air and vaporized fuel. Intake valve 306 operates as previously described, allowing compressed air to enter the housing slot 308 adjacent to piston 300 before the compression stroke of piston 300. Near the end of the compression stroke, the injection of fuel into the combustion chamber 310 occurs, followed with the ignition of the fuel by sparkplug 312.

Referring to an engine built with fuel injection in accordance with this invention. Here the shape of piston 314 has been modified, particularly by reducing the angle of sloped side 316, to decrease the volume of space remaining around the outer surfaces of the piston when it is pushed to the outward end of its motion. This is done to increase the compression of the air with the compression portion of the operational cycle of the engine. For the diesel cycle, the outward movement of piston 314 compresses to between one fourteenth and one eighteenth of its original volume, thereby bringing the air to a temperature of about 900 to 100 degrees Fahrenheit. At these temperatures, when diesel fuel is injected into combustion chamber 318, combustion occurs without the benefit of a spark plug, which is therefore eliminated from this configuration.

In applications using conventional carburation, as well as in applications using fuel injection, this invention combines features and advantages associated with conventional two stroke cycle and four stroke cycle engines. A principle advantage of the two stroke cycle engine is that it can produce higher torque and power ratings that a four stroke cycle engine of similar size, since the two stroke cycle engine produces one power producing expansion cycle per reciprocation of each piston. A typical two stroke cycle engine produces 1.5 to 1.75 times as much power as a four stroke cycle engine with a similar displacement volume. The engine of this invention is a two stroke cycle type, since one expansion cycle occurs per piston reciprocation. However, an important advantage of a conventional four stroke cycle engine is the positive displacement of exhaust gasses during the exhaust cycle by the piston movement. This is generally significantly more effective than the scavenging process of a two stroke cycle engine, where a fuel air mixture being pushed into a cylinder displaces, as well as possible, the exhaust gasses present from the previous expansion cycle. In the engine of this invention, exhaust gasses are also positively displaced by the motion of the trailing surface of the rotor slot relative to the vane. While conventional four stroke cycle engines require the use of intake and exhaust valves, and conventional two stroke cycle engines do not require such valves, the configurations shown as examples of this invention use an intake valve but not an exhaust valve.

Although the invention has been described in preferred embodiments or configurations with some degree of particularity, it is understood that this disclosure has been made only by way of example, and that numerous changes in the details of construction, fabrication, and use may be made without departing from the spirit and scope of the invention.

What is claimed is:

1. An internal combustion engine comprising:
   a stationary housing having a housing interface surface with a housing opening extending from said housing interface surface;
   a rotor having a rotor interface surface, said rotor being mounted for rotation in said housing with said rotor interface surface being juxtaposed to said housing interface surface, said rotor having a rotor slot therein extending from said rotor interface surface, said rotor slot having a leading edge on the side thereof in the direction of rotation, said rotor slot moving past said housing opening during rotation of said rotor;
   a piston slideably mounted in said housing opening;
   a vane slideably mounted in said housing opening and displaced from said piston in a direction opposite to the direction of rotation;
   means for independently moving said vane and piston into said rotor slot, as said rotor slot moves adjacent to said housing opening; and
   means for providing a combustible fuel into a region within said housing opening between said piston and said leading edge, said fuel undergoing combustion after said vane is moved into said slot for moving said leading edge.

2. An internal combustion engine as recited in claim 1, wherein said moving means includes a piston cam surface in said rotor having a lobe extending at an angular position corresponding to said rotor slot, and piston cam follower means, movably mounted in said housing, for transmitting motion between said piston cam surface and said piston.

3. An internal combustion engine as recited in claim 2, wherein said moving means further includes a vane cam surface in said rotor having a lobe extending an angular position corresponding to said rotor slot, and vane cam follower means movably mounted in said housing, for transmitting motion between said vane cam surface and said vane.

4. An internal combustion engine as recited in claim 1,
   wherein said rotor further has a rotor outer surface, with said rotor slot extending through said rotor between said rotor interface surface and said rotor outer surface; and
   wherein said housing further has an external shell extending adjacent to said rotor outer surface.

5. An internal combustion engine as recited in claim 4, further including an exhaust port extending through said shell adjacent to said vane but displaced therefrom in a direction opposite to the direction of rotation.

6. An internal combustion engine as recited in claim 4, further including igniter means extending through an aperture in said shell towards said piston and means for causing said igniter means to ignite said combustible fuel as outward movement of said piston becomes substantially complete.

7. An internal combustion engine as recited in claim 6, wherein said means for providing combustible fuel includes carburation means for supplying a mixture of air and fuel vapor to an intake port connected by an intake passage with an area within said housing opening adjacent to said piston.

8. An internal combustion engine as recited in claim 7, wherein said means for providing combustible fuel further includes a valve in said intake passage, said valve having a closed position, in which said passage is closed, and an open position, in which said passage is open, and valve moving means for moving said valve between said closed and open positions in coordination with said moving means.

9. An internal combustion engine as recited in claim 8, wherein said valve moving means includes a valve cam surface as part of said rotor, said valve cam surface including a lobe extending at an angular position corresponding to said rotor slot, and valve cam follower means movably mounted within said housing for transmitting motion between said valve cam surface and said valve.

10. An internal combustion engine as recited in claim 4, further including a fuel injector extending from outside said shell into an aperture through said shell, outwardly adjacent to said piston, fuel supply means for providing fuel to said fuel injector, and means for actuating said fuel injector to inject fuel adjacent to said piston approximately when an outward movement of said piston is completed.

11. An internal combustion engine as recited in claim 10, wherein said means for providing combustible fuel includes means for supplying air to an intake port connected by an intake passage with an area within said housing opening adjacent to said piston, and a valve in said intake passage, said valve having a closed position, in which said passage is closed, and an open position, in which said passage is open.

12. An internal combustion engine as recited in claim 11, wherein said valve moving means includes a valve cam surface as part of said rotor, said valve cam surface including a lobe extending at an angular position corresponding to said rotor slot, and valve cam follower means movably mounted within said housing for transmitting motion between said valve cam surface and said valve.

13. An internal combustion engine as recited in claim 10, wherein clearance spaces between said piston and surrounding structures when said piston is moved fully outward before additional rotation of said rotor result in the heating of air from said means for providing combustible fuel to about 900 to 1100 degrees Fahrenheit.

14. An internal combustion engine as recited in claim 1,
wherein said stationary housing includes a housing hub extending axially in a first direction, said housing interface surface forming a cylindrical outside surface of said housing hub portion, and said housing opening extending radially inward from said housing interface surface; and
wherein said rotor includes an annular portion extending axially opposite said first direction, said rotor interface surface forming a cylindrical interior surface of said annular portion, and said rotor slot extending radially outward from said rotor interface surface.

15. An internal combustion engine as recited in claim 14,
wherein said housing hub has an annular shape and extends axially in said first direction around a central region, having a cylindrical internal surface;
wherein said rotor further includes a rotor hub extending axially opposite to said first direction into said central region; and
wherein said housing further includes an end wall extending adjacent to said central region.

16. An internal combustion engine as recited in claim 15,
wherein said rotor hub includes a piston cam surface, said piston cam surface including a lobe extending in an angular location corresponding to said rotor slot;
wherein said end wall includes a piston drive pivot; and
wherein said moving means includes a piston cam follower pivotably mounted on said piston drive pivot, said piston cam follower having a first arm held in engagement with said piston cam surface and a second arm engaging said piston through a linkage.

17. An internal combustion engine as recited in claim 15,
wherein said rotor hub includes a vane cam surface, said vane cam surface including a lobe extending in an angular location corresponding to said rotor slot;
wherein said end wall includes a vane drive pivot, and
wherein said moving means includes a vane cam follower pivotably mounted on said vane drive pivot, said vane cam follower having a first arm held in engagement with said vane cam surface and a second arm engaging said vane through a linkage.

18. An internal combustion engine as recited in claim 15, wherein:
said rotor hub includes a valve cam surface, said valve cam surface including a lobe extending in an angular location corresponding to said rotor slot;
said means for providing combustible fuel includes an intake port connected to a source of combustible mixture, an intake valve connecting said intake port with an area in said housing opening, and a valve cam follower having a first arm held in engagement with said valve cam surface and a second arm engaging said intake valve.

19. An internal combustion engine as recited in claim 15, wherein said central region includes an internal oil reservoir.

20. An internal combustion engine as recited in claim 19,
wherein said rotor is mounted for rotation about a horizontal axis; and
wherein said internal oil reservoir is contained on a first side by said end wall of said housing, on a side opposite said first side by a reservoir plate extending upward from a lower portion of said housing hub, and between said end wall of said housing and said reservoir plate by an arcuate portion of said cylindrical inner surface of said housing hub.

21. An internal combustion engine as recited in claim 19,
wherein said rotor is mounted for rotation about a vertical axis; and
wherein said internal oil reservoir is contained on a lower side by said end wall and radially outward by internal surfaces of said housing.

22. An internal combustion engine as recited in claim 1,
wherein said housing interface surface is flat;

wherein said rotor interface surface is flat;
wherein said piston is slideably mounted to move in a direction parallel to said rotor axis; and
wherein said vane is slideably mounted to move in a direction parallel to said rotor axis.

23. An internal combustion engine as recited in claim 22,
wherein said stationary housing includes a first housing, a second housing, and a central block, said first and second housings being generally cylindrical, centrally open and centrally attached to extend from opposite sides of said central block, said central block including aperture means to permit the movement of said piston and said vane therein;
wherein said rotor includes an impeller, a cam plate, and a shaft, said shaft being rotatably mounted within said housing, said impeller being mounted on said shaft to rotate within said first housing and said cam plate is mounted on said shaft to rotate within said second housing;
wherein said rotor interface surface is a surface of said impeller adjacent to said central block; and
wherein said housing interface surface is a surface of said central block adjacent to said impeller.

24. An internal combustion engine as recited in claim 23, wherein said moving means includes a piston cam surface as part of said cam plate, said piston cam surface including a lobe extending at an angular position corresponding to said rotor slot, and piston cam follower means movably mounted within said housing for transmitting motion between said piston cam surface and said piston.

25. An internal combustion engine as recited in claim 23, wherein said moving means includes a vane cam surface as part of said cam plate; said vane cam surface including a lobe extending at an angular position corresponding to said rotor slot, and vane cam follower means movably mounted within said housing for transmitting motion between said vane cam surface and said vane.

26. An internal combustion engine as recited in claim 23, wherein said means for providing combustible fuel includes:
an intake port into which said combustible fuel is provided:
a passage extending between said intake port and an open area within said central block adjacent to said piston;
a valve having a closed position in which said passage is blocked and an open position in which said passage is open;
a valve cam surface as part of said cam plate; said valve cam surface including a lobe extending at an angular position corresponding to said rotor slot; and
valve cam follower means movably mounted within said housing, transmitting motion between said valve cam surface and said valve.

27. An internal combustion engine as recited in claim 23, wherein:
said shaft turns about a vertical axis;
said impeller is above said central block;
said cam plate is below said central block; and
an oil reservoir is formed in said second housing.

28. An internal combustion engine as recited in claim 23,
wherein said rotor slot extends from said rotor interface surface of said impeller to a cylindrically shaped outer surface of said impeller; and
wherein said first housing includes an annular surface extending outwardly adjacent to said cylindrically shaped outer surface of said impeller.

29. An internal combustion engine as recited in claim 28, further including:
a spark plug extending from outside said annular surface, into an aperture through said annular surface, outwardly adjacent to said piston; and
means for providing an electrical spark at a contact region of said spark plug approximately when an outward movement of said piston is completed.

30. An internal combustion engine as recited in claim 23, further including:
a fuel injector extending from outside said annular surface into an aperture through said annular surface, outwardly adjacent to said piston;
fuel supply means for providing fuel to said fuel injector; and
means for actuating said fuel injector to inject fuel outward adjacent to said piston approximately when an outward movement of said piston is completed.

31. An internal combustion engine as recited in claim 1, wherein said moving means moves
said vane in a first vane motion in a first direction to bifurcate space within said rotor slot as a leading surface of said rotor slot moves adjacently past said vane;
said piston in a first piston motion in said first direction to compress said combustible fuel within said rotor slot after said vane is moved;
said vane in a second vane motion opposite said first direction before a trailing surface of said rotor slot moves adjacently past said vane; and
said piston in a second piston motion opposite said first direction before a trailing surface of said rotor slot moves adjacently past said piston.

32. An internal combustion engine as recited in claim 31, wherein said means for providing combustible fuel includes:
an intake port into which said combustible fuel is provided:
a passage extending between said intake port and an open area within said stationary housing adjacent to said piston; and
a valve having a closed position in which said passage is blocked and an open position in which said passage is open, said valve being driven from said closed position to said open position and back to said closed position before said first piston motion.

33. An internal combustion engine as recited in claim 31, further including a spark plug mounted, with an inward directed contact region, in an aperture within a portion of said housing adjacent to an outward extending portion of said rotor slot and means for providing an electrical spark at said contact region approximately when said first piston motion is completed.

34. An internal combustion engine as recited in claim 31, further includes a fuel injector mounted, with an inward directed output, in an aperture within a portion of said housing adjacent to an outward extending portion of said rotor slot, and means for actuating said fuel injector to inject fuel into a space adjacent to said piston approximately when said first piston movement is completed.

35. An internal combustion engine as recited in claim 1,
   wherein said rotor includes a plural of rotor slots positioned circumferentially around said rotor, each rotor slot extending into said rotor from said rotor interface surface, and each rotor slot moving past said housing opening during rotation of said rotor; and
   wherein said moving means includes piston actuation means, in angular alignment with at least one rotor slot, for actuating operation of said piston, and vane actuation means, in angular alignment with at least said one rotor slot, for actuating operation of said vane.

36. An internal combustion engine as recited in claim 35, wherein said moving means includes piston actuation means, in angular alignment with each rotor slot, for actuating operation of said piston, and vane actuation means, in angular alignment with each rotor slot, for actuating operation of said vane.

37. An internal combustion engine as recited in claim 36,
   wherein said means for providing combustible fuel includes an intake port receiving said combustible fuel, a passage between said intake port and said region within said housing opening, a valve having a closed position in which said passage is blocked and an open position in which said passage is open, and valve moving means for moving said valve in either direction between said open and closed positions; and
   wherein said rotor further includes valve actuation means, in angular alignment with each rotor slot, for actuating operation of said valve moving means.

38. An internal combustion engine as recited in claim 35,
   wherein said means for providing combustible fuel includes an intake port for receiving said combustible fuel, a passage between said intake port and said region within said housing opening, a valve having a closed position in which said passage is blocked and an open position in which said passage is open, and valve moving means for moving said valve in either direction between said open and closed positions; and
   wherein said rotor further includes valve actuation means, in angular alignment with said one rotor slot, for actuating operation of said valve moving means.

39. An internal combustion engine comprising:
   a stationary housing having a housing interface surface with a first plurality of housing slots extending into said housing from said housing interface surface;
   a piston slideably mounted within each housing slot;
   a vane slideably mounted adjacent to each piston, displaced therefrom in a direction opposite a preferred direction of rotation;
   a rotor having a rotor interface surface with a second plurality of rotor slots extending into said rotor from said rotor interface surface, said rotor being mounted for rotation about a rotor axis in said preferred direction of rotation within said housing, said rotor interface surface extending outwardly adjacent to said housing interface surface, each rotor slot moving past each housing slot during each revolution of said rotor, said rotor including piston actuation means, in angular alignment with each rotor slot, for actuating movement of said pistons, and vane actuation means, in angular alignment with each rotor slot, for actuating movement of said vanes;
   piston moving means, in angular alignment with each housing slot and responsive to said piston actuation means, for moving each piston;
   vane moving means, in angular alignment with each housing slot and responsive to said vane actuation means, for moving each vane;
   intake means for providing combustible fuel into a region within each housing slot adjacent to a piston therein; and
   an exhaust port within said housing in angular alignment with each rotor slot.

40. An internal combustion engine as recited in claim 39,
   wherein said piston actuation means includes a piston cam surface on said rotor; and
   wherein said piston drive means includes means for transmitting motion between said piston cam surface and each piston.

41. An internal combustion engine as recited in claim 39;
   wherein said vane actuation means includes a vane cam surface on said rotor; and
   wherein said vane drive means includes means for transmitting motion between said vane cam surface and each vane.

42. An internal combustion engine as recited in claim 39,
   wherein said intake means includes an intake port for receiving said combustible fuel adjacent to each housing slot, a passage between said intake port and said housing slot adjacent to a piston therein, and a valve having a closed position in which said passage is closed and an open position in which said passage is open;
   wherein said rotor includes, in addition, valve actuation means, in angular alignment with each rotor slot, for actuating movement of said valve; and
   wherein said engine includes, in addition, valve moving means, in angular alignment with each housing slot and responsive to said valve actuation means, for moving each valve.

43. An internal combustion engine as recited in claim 42,
   wherein said valve actuation means includes a valve cam surface on said rotor; and
   wherein said valve moving means includes means for transmitting motion between said valve cam surface and each valve.

44. An internal combustion engine as recited in claim 41,
   wherein said rotor includes in addition a rotor outer surface, with each rotor slot extending through said rotor between said rotor interface surface and said rotor outer surface; and
   wherein said housing includes in addition a shell extending adjacent to said rotor outer surface.

45. An internal combustion engine as recited in claim 44 further including a spark plug extending from outside said shell into an aperture through said shell, outwardly adjacent to each piston, and ignition means for providing an electrical spark at a contact region of each spark plug approximately when an outward movement of an adjacent said piston is completed.

46. An internal combustion engine as recited in claim 45, wherein said ignition means includes:
a stator having a first plurality of stator contacts, identical in angular spacing to said first plurality of housing slots, each stator contact being electrically connected to a corresponding spark plug;
a rotator having a second plurality of rotator contacts, identical in angular spacing to said second plurality of rotor slots, each rotator contact being electrically connected to a common terminal, said rotator being rotatably mounted to turn within said stator with each rotator contact electrically contacting each stator contact sequentially during rotation of said rotator; and
means for driving said rotator in synchronization with said rotor, at the same rotational speed as said rotor.

47. An internal combustion engine as recited in claim 44 further including a fuel injector extending from outside said shell into an aperture through said shell, outwardly adjacent to each piston, fuel supply means for providing fuel to each fuel injector, and means for actuating each fuel injector to inject fuel into an adjacent said rotor slot approximately when an outward movement of an adjacent said piston is completed.

48. An internal combustion engine as recited in claim 44, further including an exhaust port extending through said shell adjacent to each vane but displaced therefrom in a direction opposite said preferred direction of rotation.

49. An internal combustion engine as recited in claim 41,
wherein said first plurality of housing slots are equally spaced around said housing interface surface; and
wherein said second plurality of rotor slots are equally spaced around said rotor interface surface.

50. An internal combustion engine as recited in claim 49, wherein said first and second pluralities are equal in number.

51. An internal combustion engine as recited in claim 50, further including a spark plug adjacent to each piston, said spark plug having a contact region directed into a housing slot passing adjacent to said piston, and ignition means for providing an electrical spark simultaneously at each contact region approximately when outward movements of said pistons are completed.

52. An internal combustion engine as recited in claim 49, wherein said first and second pluralities differ in number by one.

53. Apparatus for propelling a rotor to turn about an axis in a preferred direction of rotation, said apparatus comprising:
a slot extending into said rotor from a rotor interface surface of said rotor, said slot having a leading surface and a trailing surface as defined by said preferred direction of rotation;
a stationary housing having means for rotatably mounting said rotor;
a housing interface surface of said housing extending adjacent to said rotor interface surface;
a housing slot extending into said housing from said housing interface surface, said housing slot being aligned with said rotor slot so that said rotor slot passes adjacently to said housing slot during rotation of said rotor;
a piston slideably mounted within said housing slot;
a vane slideably mounted adjacent to said piston, displaced from said piston in a direction opposite said preferred direction of rotation;
vane moving means for moving said vane from an initial vane position into said rotor slot as said leading surface of said rotor slot moves adjacently past said vane;
means for providing a combustible fuel into a portion of said housing slot adjacent to said piston;
piston moving means, operating after movement of said vane into said rotor slot, for moving said piston from an initial piston position to compress said combustible mixture;
ignition means, operating approximately at the completion of motion provided by said first piston moving means, for igniting said combustible mixture;
said piston moving means returning said piston to said initial piston position after ignition of said combustible mixture;
said vane moving means, operating before said trailing surface of said rotor slot moves adjacently past said vane, for returning said vane to said initial vane position; and
exhaust means, operating after said second vane moving means, for removing products of combustion from said rotor slot.

54. A rotary internal combustion engine comprising:
a stationary housing having a rotor receiving track therein and further having a fuel port through which combustible fuel flows and an exhaust port through which exhaust flows after combustion of said fuel;
a rotor shaped to rotate in said track, said rotor having an opening therein which rotates past said fuel port and said exhaust port, said opening being sized to permit both said fuel port and said exhaust port to be aligned with said opening at the same time;
piston and vane means, affixed in said housing, for being inserted into said opening as said opening rotates past said exhaust port and said fuel port, said vane being inserted into said opening between said exhaust port and said fuel port and prior to said piston being inserted into said opening; and
means for causing said fuel to flow through said fuel port after said vane is fully inserted in said opening and for thereafter causing said fuel to undergo combustion as said vane remains fully inserted in said opening.

55. The engine according to claim 54 wherein said vane and piston are removed from said opening after said combustion occurs.

56. The engine according to claim 55
wherein after combustion occurs, exhaust gas remains; and
wherein said exhaust gas is rotated in said opening to an exhaust port as said opening rotates in said track.

57. The engine according to claim 56 wherein said vane is inserted into said opening at a position adjacent to said exhaust port.

58. The engine according to claim 54,
wherein said rotor has a plurality of openings therein;
wherein said housing has a plurality of fuel ports and exhaust ports; and
wherein said engine has plurality of pistons and vanes, each piston and vane being associated with a fuel port and an exhaust port, each piston and vane being affixed in said housing for being inserted into an opening as that opening rotates past the associated exhaust port and fuel port, each vane being inserted into that opening between the associated exhaust port and fuel port and prior to the piston being inserted into that opening.

* * * * *